(12) United States Patent
Argiro

(10) Patent No.: US 10,955,920 B2
(45) Date of Patent: Mar. 23, 2021

(54) STACKED, VERY HIGH-DENSITY PCB CONFIGURATION IN A MOBILE DEVICE WHICH ALLOWS FOR SIGNIFICANTLY REDUCING THE SIZE OF THE MAIN BOARD SO AS TO MAKE SPACE FOR OTHER COMPONENTS

(71) Applicant: Chris Argiro, Toronto (CA)

(72) Inventor: Chris Argiro, Toronto (CA)

( * ) Notice: Subject to any disclaimer, the term of this patent is extended or adjusted under 35 U.S.C. 154(b) by 1050 days.

(21) Appl. No.: 15/196,019

(22) Filed: Jun. 28, 2016

(65) Prior Publication Data

US 2016/0328082 A1 Nov. 10, 2016

Related U.S. Application Data

(63) Continuation-in-part of application No. 14/862,327, filed on Sep. 23, 2015, now Pat. No. 9,411,467, which
(Continued)

(51) Int. Cl.
*H05K 1/00* (2006.01)
*G06F 3/01* (2006.01)
(Continued)

(52) U.S. Cl.
CPC .......... *G06F 3/016* (2013.01); *A63F 13/213* (2014.09); *A63F 13/218* (2014.09); *A63F 13/2145* (2014.09); *A63F 13/28* (2014.09); *G06F 3/0393* (2019.05); *G06F 3/04162* (2019.05); *G06F 3/04883* (2013.01); *G06F 3/04886* (2013.01); *A63F 2300/1056* (2013.01); *A63F 2300/1075* (2013.01); *G06F 3/044* (2013.01); *G06F 2203/04808* (2013.01); *G06F 2203/04809* (2013.01)

(58) Field of Classification Search
USPC ........................................................ 361/748
See application file for complete search history.

(56) References Cited

U.S. PATENT DOCUMENTS

2002/0162214 A1* 11/2002 Hetherton ............... H01C 7/18
29/623
2007/0007353 A1* 1/2007 Danielson .......... G06K 7/10881
235/462.46
(Continued)

*Primary Examiner* — Andargie M Aychillhum

(57) ABSTRACT

A precise, very high-density and miniaturized printed circuit board (PCB) structure comprising a substrate-like PCB configuration is provided (and stacked to further increase integration in a fixed area) for reducing the occupied area of, for example, a mobile phone's main printed circuit board. The PCB area reduction hereof being a critical design feature used to create internal space in the mobile device so as to at least allow implementing a substantially larger battery (i.e. the battery is comparably upsized because it is reconfigured from a traditional configuration to fit into at least some of the created space) or to add functions. A photolithography process or like process is used to define the circuit pattern on the PCB structure so as to at least enable finer lines and spaces thereof than that provided by traditional subtractive PCB manufacturing. This abstract is not intended to be a complete description of, or limit the scope of, the invention.

27 Claims, 12 Drawing Sheets

Figure 1:
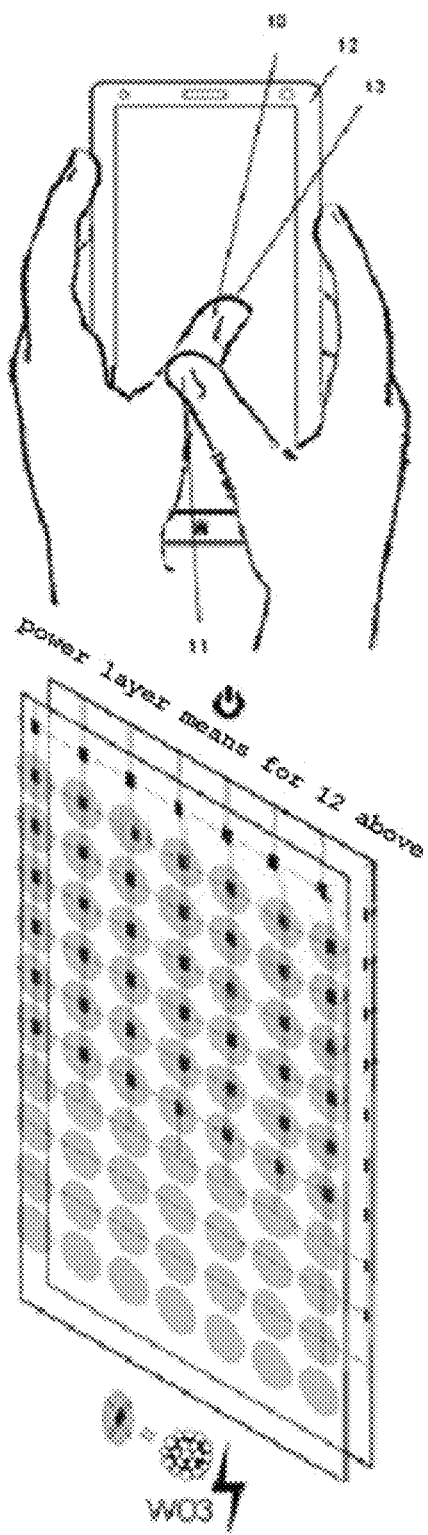

Related U.S. Application Data is a continuation-in-part of application No. 14/062,824, filed on Oct. 24, 2013, now Pat. No. 9,158,387, which is a continuation of application No. 13/635,836, filed as application No. PCT/IB2011/051049 on Mar. 12, 2011, now Pat. No. 8,599,162.

(60) Provisional application No. 61/344,158, filed on Jun. 2, 2010, provisional application No. 61/282,692, filed on Mar. 18, 2010.

(51) Int. Cl.
| | | |
|---|---|---|
| *G06F 3/0488* | (2013.01) | |
| *A63F 13/2145* | (2014.01) | |
| *A63F 13/218* | (2014.01) | |
| *A63F 13/28* | (2014.01) | |
| *A63F 13/213* | (2014.01) | |
| *G06F 3/039* | (2013.01) | |
| *G06F 3/041* | (2006.01) | |
| *G06F 3/044* | (2006.01) | |

(56) References Cited

U.S. PATENT DOCUMENTS

| | | | |
|---|---|---|---|
| 2007/0057928 A1* | 3/2007 | Prados | B60K 35/00 |
| | | | 345/173 |
| 2008/0113746 A1* | 5/2008 | Williams | G07F 17/3211 |
| | | | 463/20 |

* cited by examiner

STACKED, VERY HIGH-DENSITY PCB CONFIGURATION IN A MOBILE DEVICE WHICH ALLOWS FOR SIGNIFICANTLY REDUCING THE SIZE OF THE MAIN BOARD SO AS TO MAKE SPACE FOR OTHER COMPONENTS

CROSS-REFERENCE TO RELATED APPLICATIONS exemplum Certain embodiments of the present invention relate to at least a main board miniaturization, the main board miniaturization comprising a stacked substrate-like circuit board assembly disposed in the volume of a mobile device. A transition of a board into a thinner product with package-substrate-like features to facilitate use of larger batteries, higher resolution displays and more. Parent Continuity Data (same inventor): This application is a Continuation in part of U.S. patent application Ser. No. 14/862,327, filed on Sep. 23, 2015, now U.S. Pat. No. 9,411,467, which is a Continuation-in-part of U.S. patent application Ser. No. 14/062,824, filed on Oct. 24, 2013, now U.S. Pat. No. 9,158,387, which is a continuation of U.S. patent application Ser. No. 13/635,836, filed on Jan. 2, 2013, now U.S. Pat. No. 8,599,162, filed as National Stage Entry Appl. No. PCT/IB2011/051049 on Mar. 12, 2011, which is a Continuation-in-part of U.S. patent application Ser. No. 13/005,315, filed on Jan. 12, 2011, now U.S. Pat. No. 8,368,662, which claims priority from U.S. Provisional Application Ser. No. 61/344,158, filed on Jun. 2, 2010, which Claims Priority from U.S. Provisional Application Ser. No. 61/282,692, filed on Mar. 18, 2010. Child Continuity Data (same inventor): U.S. patent application Ser. No. 15/868,470, filed on Jan. 11, 2018, and claims the benefit of instant U.S. patent application Ser. No. 15/196,019. All applications referenced in this paragraph, their complete disclosures, are hereby fully incorporated by reference herein for all purposes.

TECHNICAL FIELD

This description relates to anomalous interfaces for touchscreen devices.

BACKGROUND OF THE INVENTION

Touchscreen devices continue to permeate today's consumer product landscape. The technology provides for a more natural form of user input; a fluent interface for actionable object manipulation, the presentation and consumption of information and actionable media, task efficiency and a smaller form factor since the display also concomitantly serves as a data-entry means. As ubiquitous and functional as the technology may be, certain touchscreen-based operating scenarios may see a benefit of providing anomalous controller and display interfaces for improving interaction thereto.

SUMMARY OF THE INVENTION ACCORDING TO EMBODIMENTS

Having noted the above, it is the desire of the present invention to provide for novel interfaces designed to improve a user's interaction with their touchscreen environments particularly.

The present disclosure describes a controller interface permitting a redesigned touchscreen sensor interface to detect both an actuating first finger placed atop a touchscreen's graphic (e.g., for traditional control of an actionable object) and an altered capacitive reading associated with said placed first finger as a second finger of a user is then placed communicably atop said placed first finger whilst said placed first finger remains in the original actuating position. Resultantly, an expanded input interface for a fixed screen location is created.

The above present disclosure said differently, by assorting distortion grades into classes of varying capacitance-governed strengths or readings in an input series as described, a fixed location on a touchscreen is thereby empowered to map additional means of input functionality.

The present disclosure also describes a controller interface wherein the touchscreen device's housing acts as an extension of the touchscreen device's touch-input or touchscreen interface.

The present disclosure further describes a simple and inexpensive touch controller interface for use in a touchscreen input environment and beyond.

The present disclosure further describes conductive game pieces, such as, but not limited to, players, characters, pieces and pegs for use with tablet-based electronic play boards. The present invention embodying said game pieces with and without RFID capability.

The present disclosure also describes a head-mounted and limpid touch-sensitive display controller; comprising a transparent display screen supporting a transparent conductive touch-controller interface applied on said display's exterior surface and used for controlling actionable objects by a user's touch. Said transparent display screen is designed to not obstruct the view of a user's physical environment when being worn over the eyes and, more particularly, responds to the capacitive distribution or touch input of a finger just as a normal capacitive touchscreen would.

The head-mounted and limpid touch-sensitive display controller introduced above may be operated with the support of at least one of one or more camera sensors (e.g. in mapping room topography and/or tracking pupils for play field vantage), depth sensors, ultrasonic-proximity sensors, infrared sensors and motion sensors; and remotely under a wired, wireless and/or intermediary-transceiver device disposition. Given its novel display/controller hybrid-design characteristics, as embodied, the present invention is thence operably adept and fluent in at least a Virtual Reality (VR) environment.

The present disclosure further describes a dynamic projection surface comprising an elastic and taut membrane and an equidistant spring-mounted rod assembly contactually associated with said membrane. Said rods are prone to manipulation by an electric field and/or magnetic field and are, under such manipulation, capable of extending (or contracting) a taut projection area, of said taut membrane, from a planar surface. Said rods at rest forming said planar surface and remaining as such until presented with a field excitation means.

Animated visual effects are promoted on the surface of said elastic membrane in accordance with these active excitation areas upon receiving a projection. Similarly, flexible glass fibers, plastic fibers and/or doped fibers may be manipulated for creating a polycephaly and waggled light influence means.

The present disclosure also describes how flexible flat panel displays may be configured to include a flexible membrane-based transistor assembly using cavity-like patterns etched in said membrane for the detection of magnetic fields associated with user touch interaction of the flat panel substrate. The present invention applies a unique structural combination to the form factor therein.

Use of electrorheological (ER) fluids, electronic inks, Gyricon, OLEDs and organic builds, to name a few, in creating rollable displays are fodder for such membrane-based transistor assembly consideration given their potential operable synergies when combined on a single and/or layered membrane.

The present disclosure also describes a visual feedback display apparatus that is intended to do for the sense of sight what haptic feedback did for the sense of touch. The visual feedback display mechanism comprising a rectangular cone, in accordance with one example, associatively coupled to a display visor and subject to movement by an electromagnetic process (e.g. resulting from current manipulation of a coil of wire associated with said cone) that interacts with a fixed magnet in the apparatus' structure. Said electromagnetic process is used to create a controlled back and forth (or any like movement depending on design) motion of said display visor, and naturally any display images associated with it, and is used for producing visual effects.

The present disclosure also describes use of an antecedent electrochromic polymer membrane designed primarily to replace the traditional color wheel used in current projection systems. The disclosed antecedent electrochromic polymer membrane is designed to switch, at intervals in the millisecond range, between serviceable colors based on an introduced low voltage by pattern electrodes (including manipulating the charge and surface ratio) with an insulating layer. More particularly, the system is capable of rapidly alternating between the primary colors of red, green and blue for constituting felicitous colored pixels on a reflective surface downstream.

Use of one or more associated mirror chips, LCD panels and/or a postliminary array of electrochromicly switchable mirrors, the latter comprising a pixel-tuner matrix, for turning pixels either on or off according to the need of color in making up a projected picture, is further disclosed. A thin-film, with achromatic properties in accordance with the present example, comprising a mirror array capable of controllably switching between mirror and transparent states with a high degree of visual fidelity—including color purity, optical contrast and millisecond response rates—is presented without suggestion of limitation.

The present disclosure also describes an optically rapt, photorefractive apparatus comprising bismuth titanium oxide, anatase or bismuth titanate. In a subjugated environment, the photorefractive and electrooptical effects of said rapt device may be manipulated under an applied electrical field or illumination in order to achieve desired visual effects.

According to one embodiment, the rapt apparatus comprises a plurality of tiny bismuth titanate lenses, equidistantly spaced and under an applied field, producing an undulated, moving image (ergo an output) on a surface under the oscillation of an applied field and is serviceable for entry into stereoscopic (e.g. left/right 3-D) split-screen environments. Oscillation of the rapt apparatus may also be administered using sound vibrations to manipulate a lens position in accordance with a divergent embodiment.

The present disclosure also describes a spastic lens apparatus with excitable regions for the promotion of visual effects.

The present disclosure also describes applications designed to transmute a touch display such as in promoting a sense of tactile registration at a touch point. In addition, a redesign of at least the outer glass layer of the multiple glass layers comprising a capacitive touchscreen is further presented to enable unique display, consumption and/or touch interaction characteristics of varying dispositions.

The present disclosure further describes a plurality of at least two transparent projection screens: vertically spaced and horizontally disposed by an isolating member intermediary, in this case an air dielectric, and designed for collectively receiving a light-source projection (said projection traversing each linked screen member) in the series; and wherein the visual effect of said projection series is to create the perception of actionable-object or on-screen content in the third dimension without the need for special viewing hardware.

The present disclosure also describes open-topography projection systems such as with using a humidity extracting and diffusion apparatus (or, generally, a water-based apparatus for the same) for creating and controlling a vapor screen and/or an air ionizing device for manipulating a proximal air region for reflection; each system or a combination thereof, at rest, forming a perdu, unobtrusive projection surface for use in projection environments. A pressurization means may also be employed where serviceable.

Other iterations and features of the present disclosure, and those duly afforded by its scope, will be apparent from the following description, figures and written claims.

The reader understands that the drawings, like all of the matter contained herein, are only intended to depict typical embodiments and are not, therefore, to be considered as limiting the scope of the invention in any way. The presented inventive matter will be described and explained with additional specificity and detail through the use of the accompanying drawings of embodiment in which:

DESCRIPTION OF THE DRAWINGS ACCORDING TO EMBODIMENTS

FIG. 1 The top of the figure illustrates an expanded input modality based on a series of altered capacitance readings originating with at least a first applied finger (in the consideration of a finger plurality in the case of multi-touch) that is placed atop a touchscreen and the subsequent contactual association of at least a second finger placed atop the first sitting finger in a finger-touch series.

FIG. 1, bottom, illustrates a first stored energy means comprising an array of nanoclusters comprising at least one of a cluster of highly conductive nano wires and a cluster of highly conductive WO3 or tungsten-trioxide nano wires; and at least one of a nano coating and a mono-layer being applied thereto, using a synthesized event, for operably serving as a current-aggregate material.

Figure 1A:
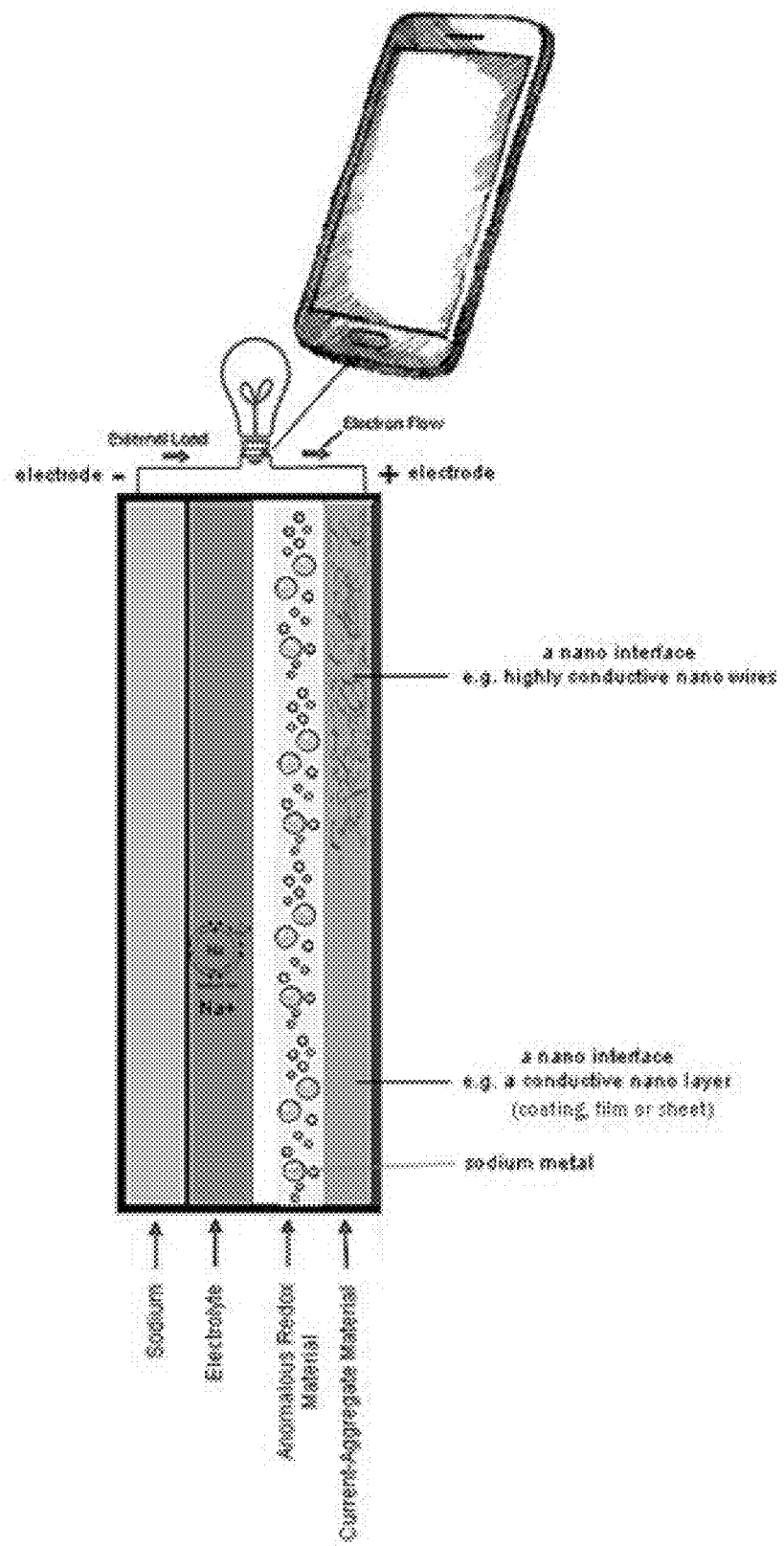

Related to FIG. 1, FIG. 1A depicts a novel configuration for a second stored energy means. The configuration, under a hermetically sealed structure, can store and dispose degrees of aggregate energy through an environmental conditioning of a sodium or a kin deposit. The negative electrode layer comprises a negative electrode metal comprised of a highly reactive metallic element used for at least one of applying a uniform layer deposition (e.g. a nano layer) of a serviceable electrochemical potential and manipulating a stored charge. The ions of the highly reactive metallic element will react with the anomalous redox material in a novel manner in accordance with the annotated figure and claims.

Both the first stored energy means of FIG. 1 and the second stored energy means of FIG. 1A are at least designed to promote a thermally safe user operation thereof.

Figure 2:
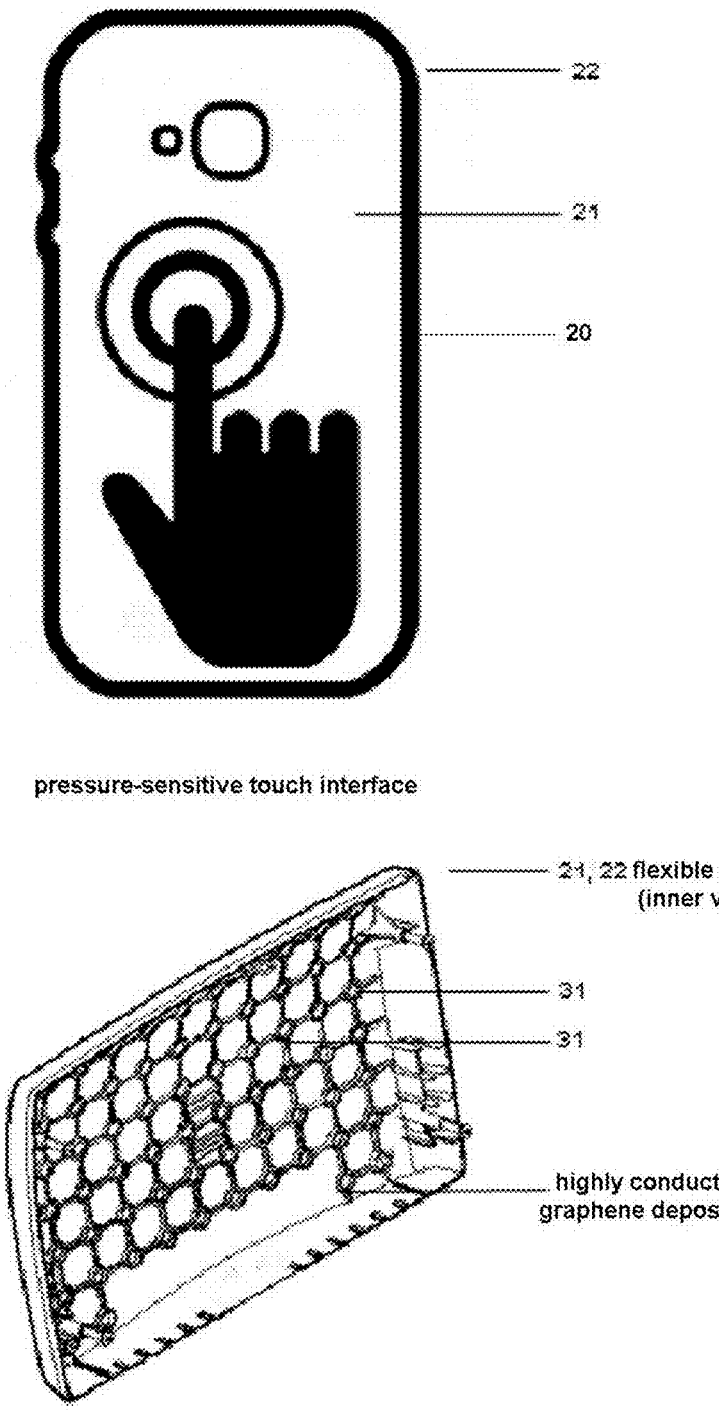

FIG. 2 depicts an instance of the touchscreen device's housing serving as an extended touch input interface of the touchscreen device. In a non-limiting example, existing circuitry, a tweaked electronic means and/or conductive channeling is used.

Figure 3:
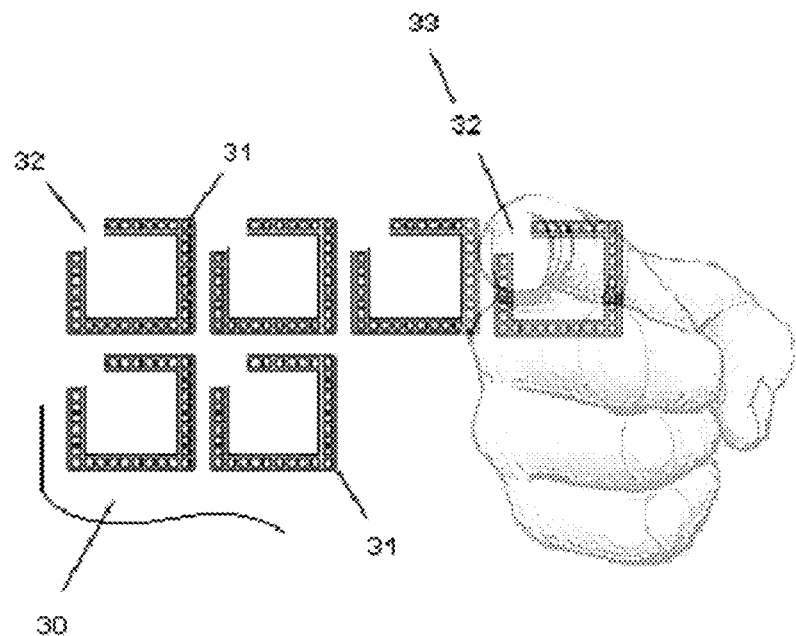

FIG. 3 is a screen's-eye-view of a simple and inexpensive conductive/capacitive touch interface, in this case being transparently applied to the screen surface, acting as the substrate, of a mobile device, comprising a plurality of discontinuous conductive elements comprising electrical breaks in their respective electrically-conductive circuit paths that are made continuous (or activated, thence registering a touch point) with the application of a user's finger.

Figure 4:
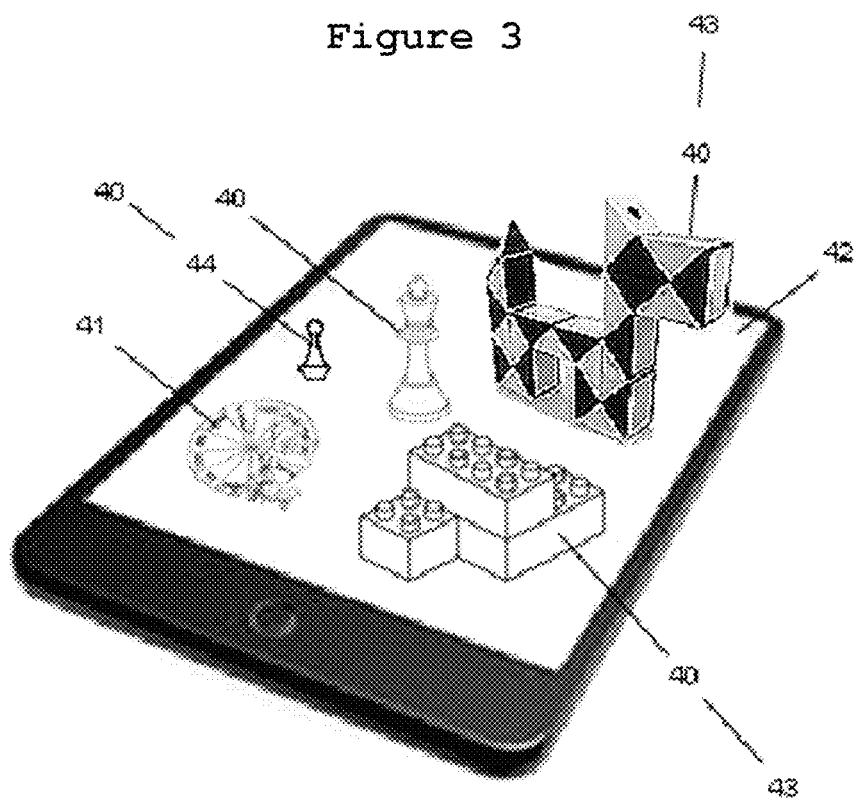

FIG. 4 illustrates a sampling of conductive game pieces, such as, but not limited to, players, characters, pieces and pegs for use with tablet-based electronic play boards. Particularly, the use of puzzle pieces, game pieces and peg hardware in the exemplar.

Figure 5:
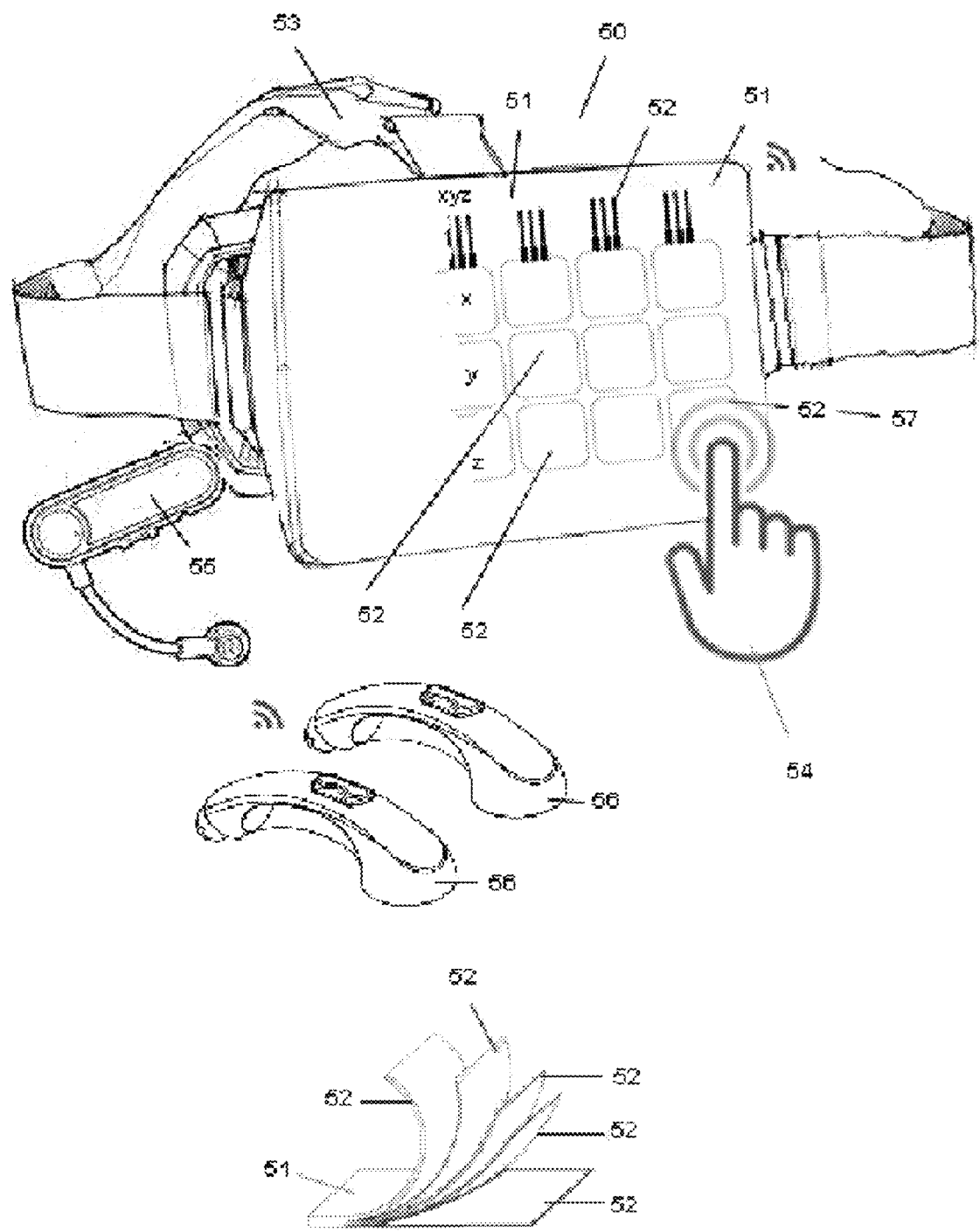

FIG. 5 represents a drawing of a head-mounted and limpid display controller comprising a see-through touch display screen, for reflecting and/or emitting a light source for registration with a user's eyes and for use in manipulating actionable objects using an applied touch-sensitive conductive plexus on its dorsal surface. In an exemplary suggestion of breadth, a/an photolithographic, PECVD, EFTEM, wet etching, magnetron and ITO sputtering, atmospheric pressure, printed, spray-on (spray coating, including ultrasonic spray) deposition and/or a pulsed laser ablation technique is/are serviceable in the structured application of said plexus.

FIG. 5, as referenced above, permits a user to, for instance, directly touch actuate a projected and/or displayed actionable graphic in real-time by retrally manipulating the associated screen region (scilicet, its touch points) with one or more fingers. The user essentially powering the touch interface using the electrical properties of his or her finger(s); all whilst not blocking or encroaching the display's frontal screen content as per its design. Optionally, the design may further comprise at least a lightweight display structure based on a nano-wire display layer configuration capable of resisting display fracture.

Figure 5A:
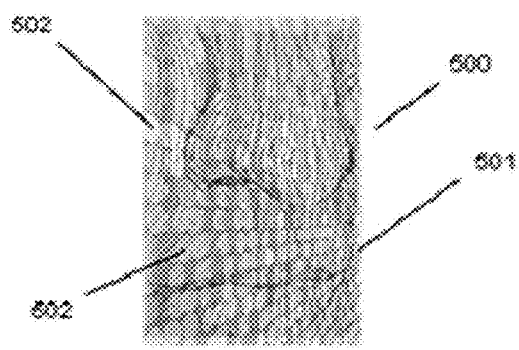

FIG. 5A is a drawing of a dynamic display surface comprising an elastic and taut membrane and an equidistant spring-mounted rod assembly contactually associated with said membrane and capable of excitation under a manipulating field to produce varying levels on said membrane's surface from a planar line. That is, certain regions of said membrane may be manipulated to extend bilaterally beyond its planar surface. Said membrane may also be designed for reflecting, emitting and/or displaying light, ergo an output, to a user's eyes. An akin manipulating field may also be used to manipulate bands of light comprising a light engine in accordance with a divergent embodiment.

Figure 5B:
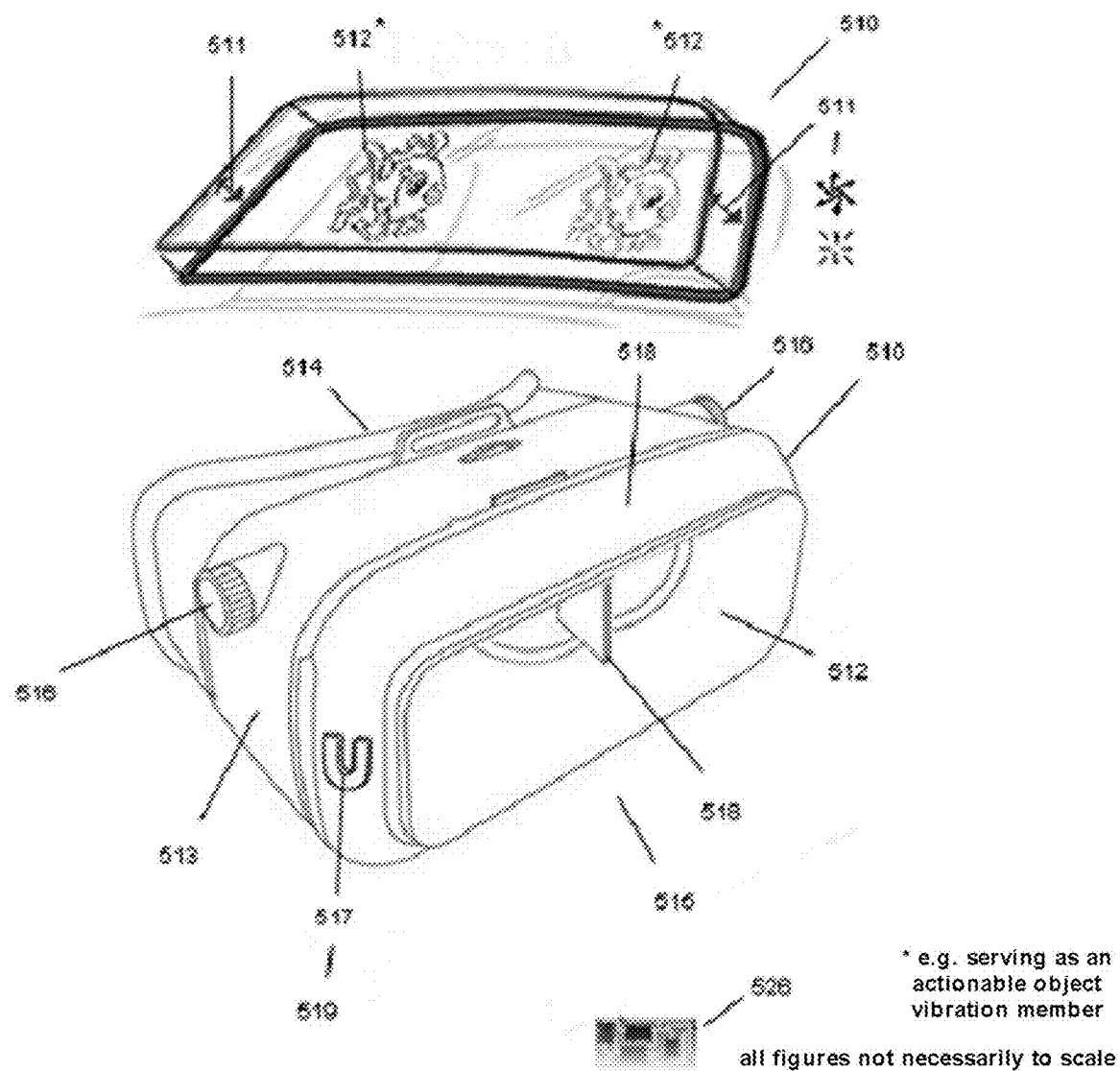

FIG. 5B is a drawing of a visual feedback display mechanism, comprising at least an oscillatory influence, that seeks to do for the sense of sight in a game environment what haptic feedback has done for the sense of touch in a game environment and wherein said visual feedback occurs in response to a game event. Said variously, the operational stimulus put forth by the inventor is to create an ocular equivalent to touch haptics.

A disposed display unit of FIG. 5B may be made to adjust in line with a user's field of vision (in line with his or her eyes) and wherein electromagnetic, pneumatic, hydraulic or any serviceable means are configured to perform said adjustment. Adjustments, including pivoting, being fluent to a controller environment and comprising a potential omnidirectional nature.

Figure 5C:
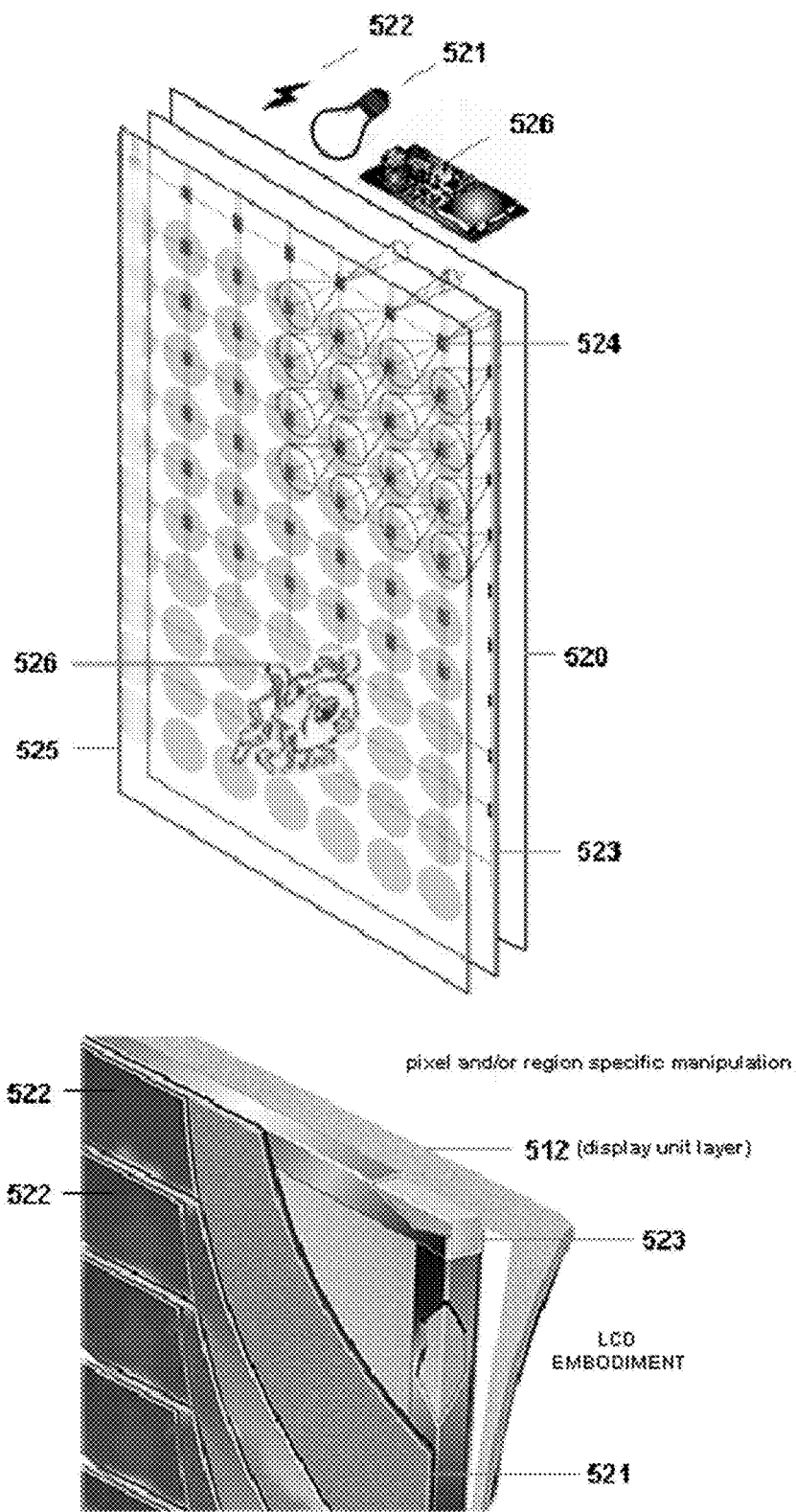

FIG. 5C illustrates an antecedent electrochromic polymer membrane designed primarily to replace the traditional color wheel used in current projection systems and to permit a reduction of a traditional form factor; ideally to a micro state. The antecedent electrochromic polymer membrane is designed to change colors, at rapid intervals in the millisecond range, based on an introduced low voltage. More particularly, at least one area of said membrane is capable of alternating between the primary colors of red, green and blue which are used for constituting felicitous colored pixels on a reflective surface downstream.

Use of one or more associated mirror chips, LCD panels and/or a postliminary membrane comprising an array of electrochromicly switchable mirrors, the latter modality comprising a pixel-tuner matrix, for turning pixels either on or off according to the need of color in making up a projected picture, is further disclosed.

Figure 5D:
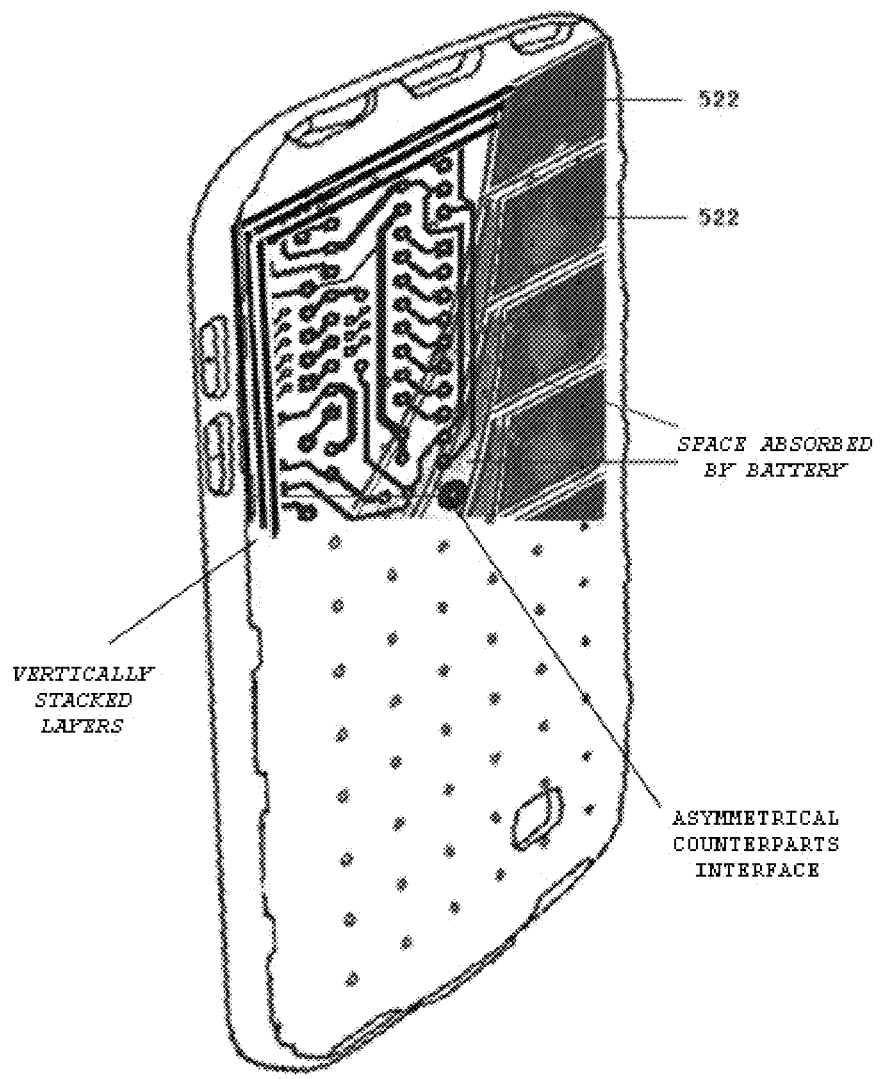

For visual clarity, FIG. 5D comprises a partially transparent view of the power assembly 522 depicted in lowermost FIG. 5C, which is optional to the configuration. Particularly, 5D shows the one or more battery et al 522 layers physically interfacing with one or more vertically-stacked substrates.

The substrates, shown vertically-stacked in an exemplary 3 layers, under a manipulated design configuration, newly offer a device assembly at least one of a cavity, a region, a channel, a space and an area not present with the existing circuitry configuration of a traditional design assembly. The power or energy 522 build is also modified accordingly to complement this type of energy configuration by variably increasing at least one of its structure, shape and size to absorb the created space; thence augmenting a traditional power yield.

Figure 5E:
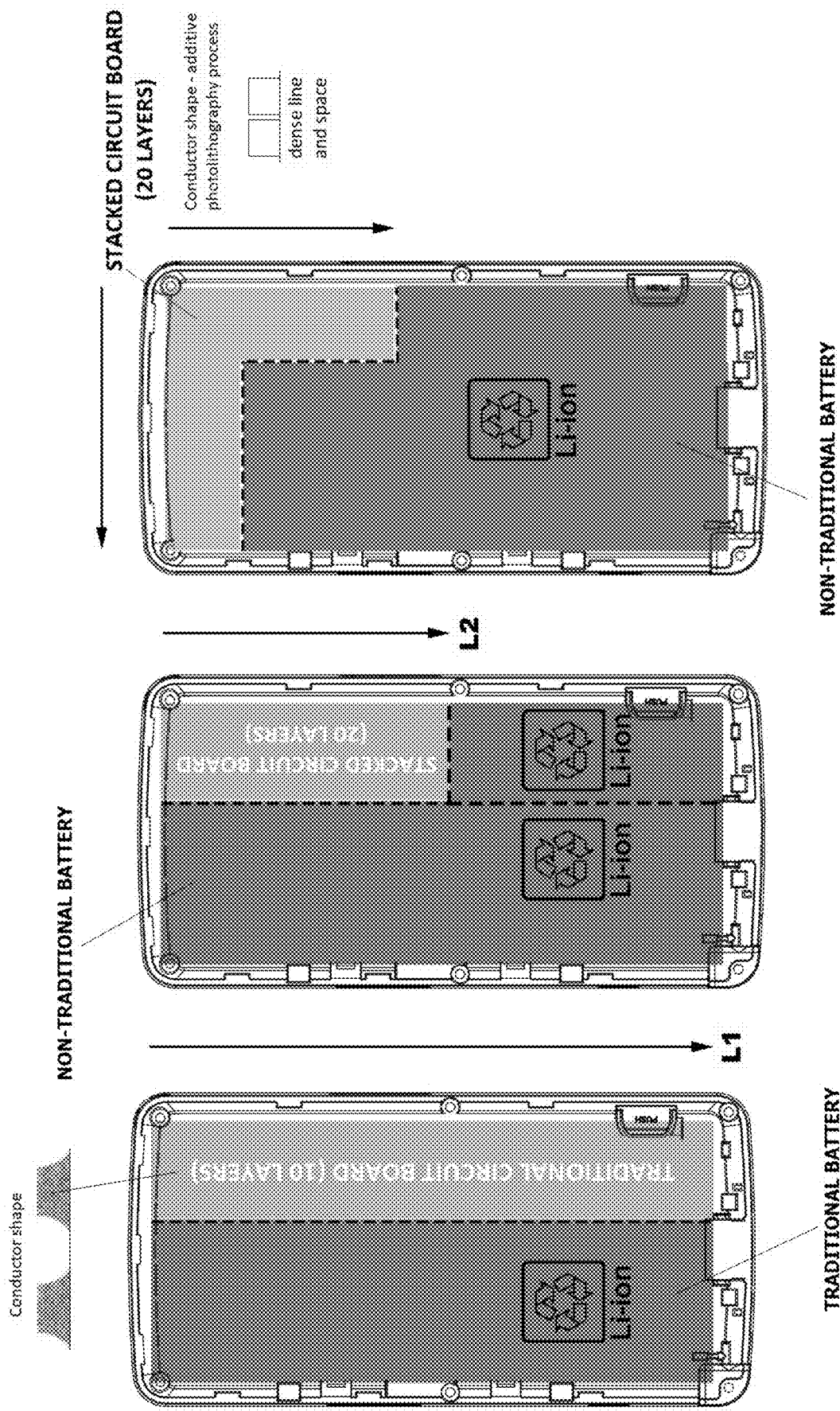

A cross-sectional view of a housing used to enclose an interior volume of a smartphone, tablet or mobile touchscreen device is shown in FIG. 5E according to a non-limiting example.

Disposed inside the housing are a stacked circuit board component having a smaller footprint than a traditional circuit board it replaces; and an interrelating nontraditional battery component, oddly shaped and larger than a traditional battery it replaces because it is extendedly built to at least partially absorb the new space resulting from the smaller footprint.

Figure 6:
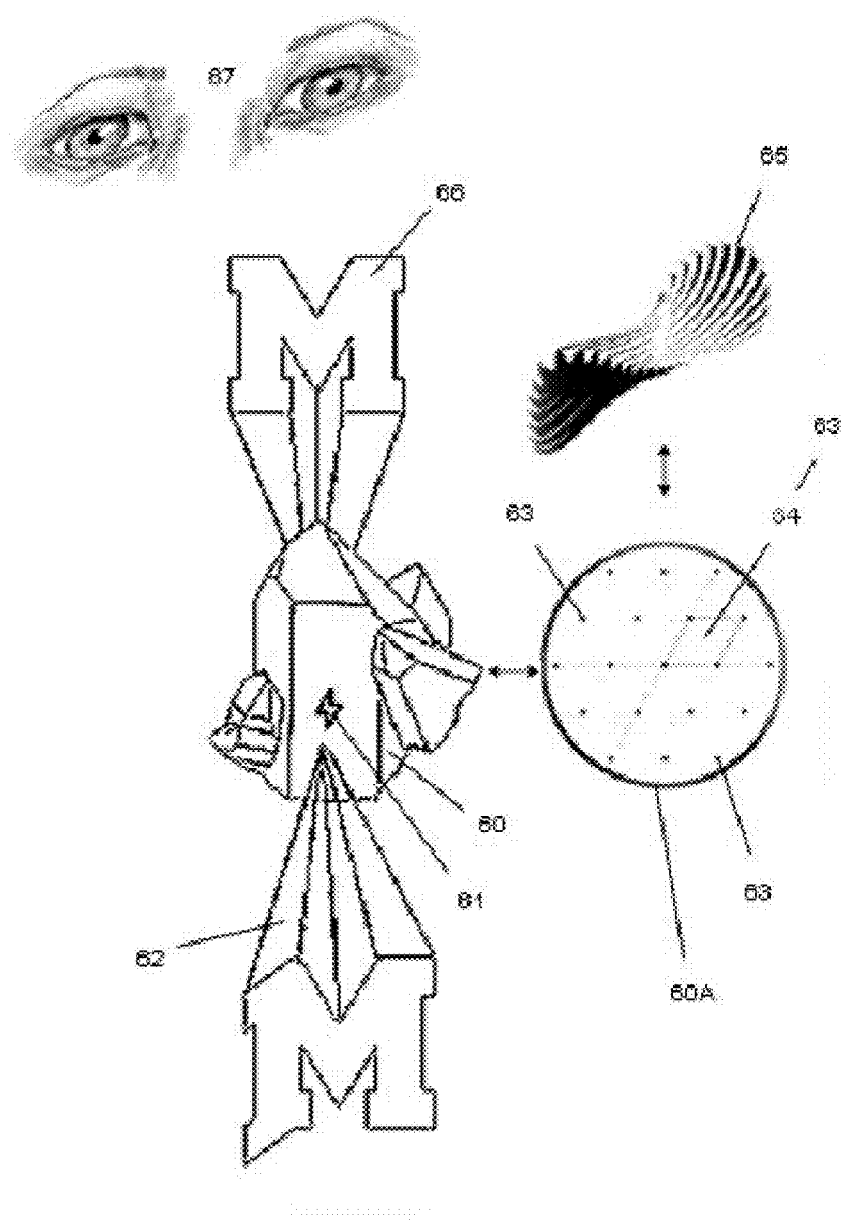

FIG. 6 illustrates an optically rapt, photorefractive apparatus for manipulating at least one light source; said device at least comprising concentrations of one or more types of single crystals exhibiting at least one of piezoelectric, ferromagnetic, photoconductive, electrooptic, electrically conductive and acoustooptic properties.

Said photorefractive apparatus of FIG. 6, for instance, comprising a manipulable refractive index that is prone to manipulation by a manipulating field, such as, but not limited to, an electrical field, a magnetic field and/or by illumination. The present embodiment being used to promote visual effects in a controller environment.

In a suggestion of breadth, an embodied rapt apparatus may be associated with an electrolytic gel that is disposed inside a manipulable saltwater electric field for diversity in tunable application. As are hermetically sealed crystal structures using a transparent fluid elastomer and tunable cholesteric liquid crystals.

Figure 7:
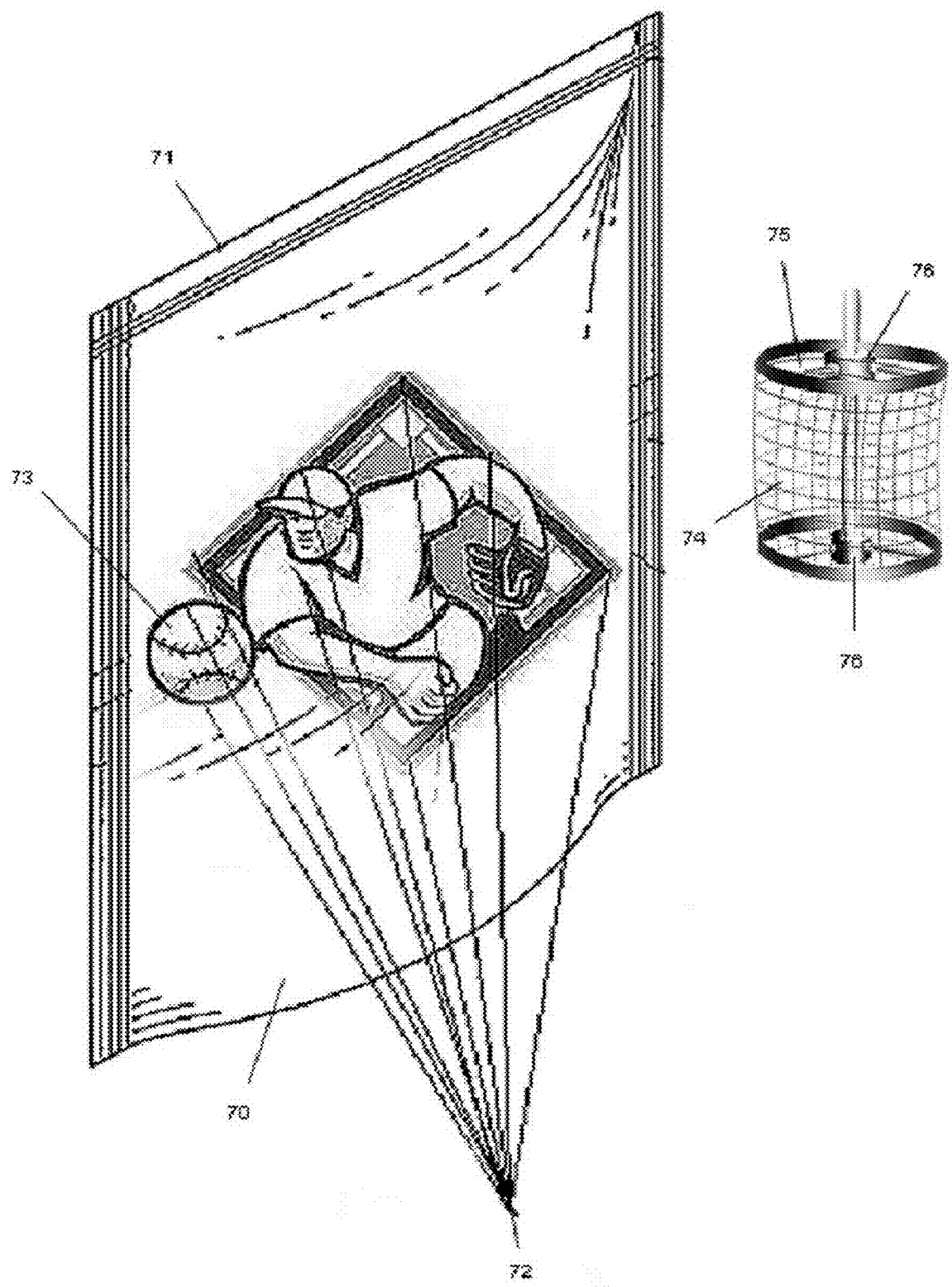

FIG. 7 embodies an arced projection screen at the anterior of a projection-screen series and at least a second flat-screen disposition at the dorsal end of said series and is used for collectively manipulating exposure from a light source.

The desired effect of said series is to jointly promote—without the need for active or passive glasses or binocular-vision hardware—the illusion of 3-D depth of one or more actionable objects displayed by said series.

Particularly, a third-dimension effect of FIG. 7 being created by the visually disposed nuances of this layered projection. According to one embodiment, a surface is described comprising an array of transparent, equidistantly arranged lenticular members extending bilaterally beyond the planar surface of at least one screen member.

Figure 7A:
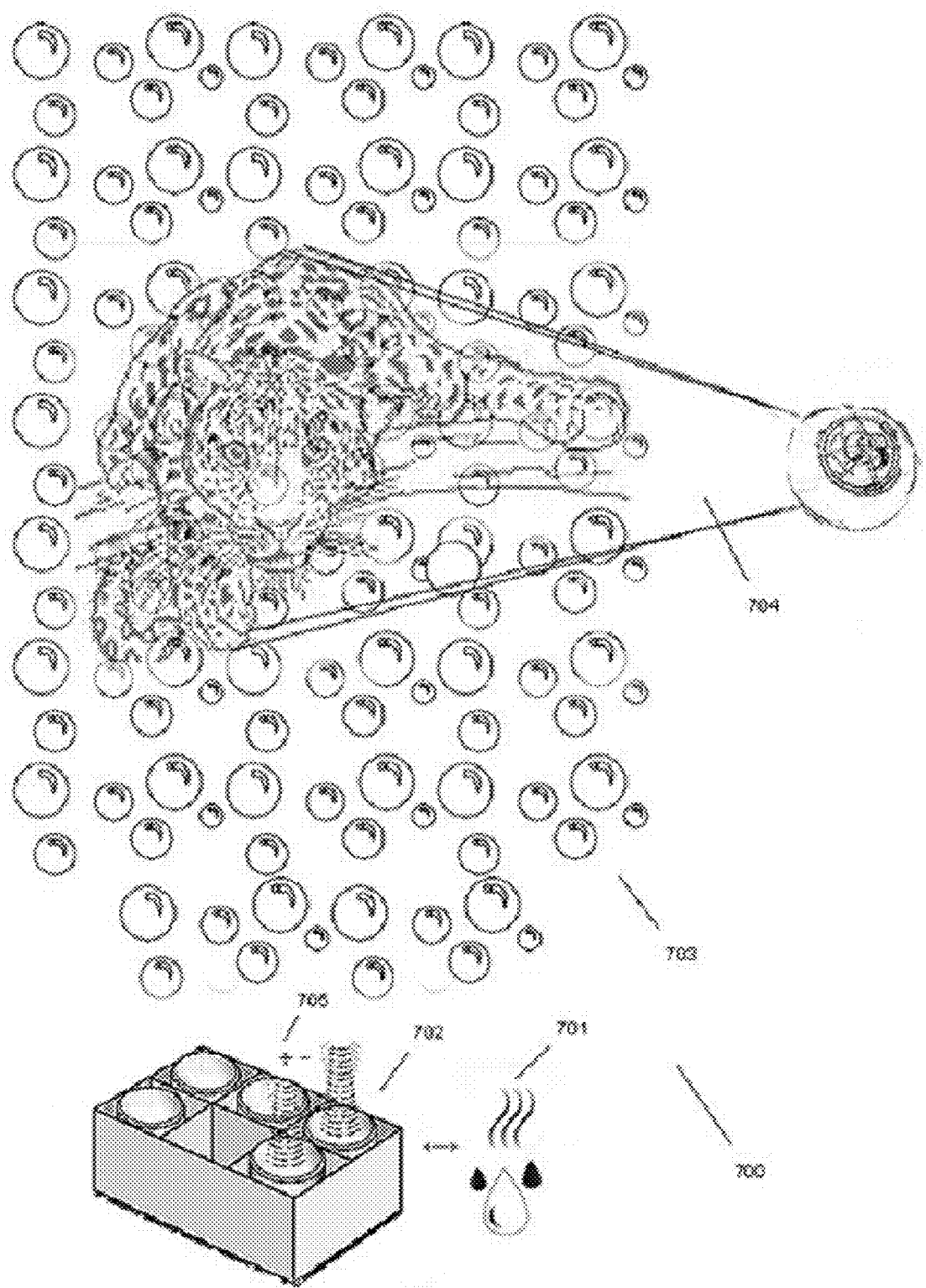

FIG. 7A depicts unobtrusive open-topography projection screen systems, in the exemplary, using at least a humidity extracting and diffusion apparatus and/or an ionic generator for creating and/or controlling a reflective surface used to reflect a cast light source and/or for yielding display forms.

A charged-water state that is manipulated by at least an opposing charge field—given that opposite charges attract, e.g. magnetic or electric—to "direct" and/or "suspend" a concentration of water particles in forming a projection region, serves as an exemplary projection surface.

DETAILED DESCRIPTION OF THE INVENTION ACCORDING TO EMBODIMENTS

The present invention relates to anomalous interfaces for touchscreen environments, mainly, and more particularly, an inventive impetus of fostering improved user input and/or interaction environments with their touchscreen devices. The present invention further focuses on the creation of dynamic display modalities and/or imaged environments designed to heighten a sense of user immersion in a controller environment, more generally.

While the disclosure is, of course, susceptible to various modifications, atypical implementations and alternative forms, specific embodiments have been shown by way of example in the drawings and described in the specification herein.

The reader, of course, understands that this disclosure is not intended to be limited to the particular forms disclosed. Rather, the disclosure is intended to cover all modifications, equivalent arrangements and structures falling within its full spirit and scope. Furthermore, various omissions, substitutions, additions and changes in the form of the embodiments described herein may be made without departing from the spirit of the inventive fodder.

FIG. 1 is a view, in accordance with an embodiment, introducing a novel way for users to interact with their touchscreen devices using a series of measurable, range-driven distortion events mapped to a fixed position on a touchscreen's surface.

The touchscreen device to which the technology will be deployed may comprise at least one of one or more Application Processors, a communication means, a software means (e.g. said Application Processors driving a software unit such as an app or OS), a SIM means, a memory means, a sensor means, a network means, a NFC means, a RFID means, an intermediary-transceiver device means, a power and power management means, an indicator means, an audio means, an interface means, a servomechanism means, a battery unit, a camera unit, an input unit and a display unit.

Whereas today's capacitive touchscreen technologies and their embedded touch-detection sensors use a distortion event of a display screen's electrostatic field as a binary event—on or off, i.e. is the screen being touched currently or not touched?—to orient and initiate touch, the present invention seeks to remove this binary limitation of traditional electrostatic field response designs.

For instance, the present invention describes capacitive-tracking technology that records grades of distortion events, based on capacitive touch variations produced by a capacitive interaction series, for a fixed screen location 13 of a touchscreen device 12. To wit, an originating touch gesture at location 13 by a first applied finger 10 marks a first distortion event and is range bound based on the level of said distortion determined by at least one of a respective touch sensor of the sensor means, related electronics and software installed to said touchscreen device 12.

As at least a second applied finger 11 is added atop said first applied finger 10 (that has remained in contact with its original touch point 13), the sensor means of said touchscreen device 12 will register a different and subsequent distortion event (of a different range or class) related to the first distortion event. Thence, unlocking additional input functionality and/or features for that (or any) fixed screen location.

Dragging a second applied finger 11 along the base of said first applied finger 10 or along the base of a user's hand, resulting in differing proximity-based grade readings in reference to alternating distances—for example, an event signal is attenuated with distance—from a first contact point with a screen, also being further serviceable to the spirit and scope of such a novel input interface.

A scrolling function across the bridge of a finger (e.g. as a left-hand finger or thumb is placed atop and dragged along a fixed right-hand finger or thumb on a touchscreen device's 12 glass surface) may be used for text-entry and/or email applications in this way, according to one possible example of utility. When added to current pressure-sensing applications, examples of such utility become far more numerous. And may be premised on its synergistic efficiencies. As a result, this technology may further serve to complement the current pressure-sensing touch input technologies.

Moreover. These "stacked" tap gestures may also, with the appropriate sensor disposition monitoring subsequent applications to the skin of an applied finger, be itself made to be pressure sensitive in providing the user with additional layers of input.

And due to the potential robustness of the presented technology, it may further still be adapted to work with the new wave of below-the-surface fingerprint identification systems: for instance, using a second finger 11 to "scroll" atop the bridge of an applied finger 10 in manipulating a pointer in response to a geographically-sensitive captcha appearing as a second-tier security measure. Said fingerprint identification system, incidentally, may be supplanted with a new generation of below-screen capacitive signature sensors capable of sensing biologically unique characteristics of the user for similar sudo entry access.

The expressed embodiment is not intended to be limiting as grades of distortion events may, of course, also be applied to inanimate objects such as with the use of headset wire to adjust speaker volumes or even answer calls.

FIG. 2 illustrates, in accordance with an embodiment, how a touchscreen device's 22 traditionally non-active housing can serve as an elongated or augmented touch input interface beyond the glass parameters 20 of said device 22; a controller disposition which may be preferable under certain user consumption environments.

An augmented touch interface for touchscreen devices 22 is shown; wherein said augmented touch interface, while independent of a touchscreen surface 20, primarily serves an auxiliary role of touch input. The augmented touch interface comprises a plurality of auxiliary touch sensors, associated to the housing 21 and preferably disposed at the rear (as shown in this figure), subjacently and/or at any serviceable edges of a touchscreen device 22, and to name a few is used for controlling one or more actionable objects being displayed on a touchscreen 20 and/or touchscreen 20 region, selecting commands and/or entering data associated with said display 20.

The novel technology presented may be delivered on-demand and, for instance, can be engaged upon sensor activation by at least external touch of the housing's 21 surface at registered touch points.

Said augmented touch interface may be linked to: at least one central processing unit for at least interpreting and executing program instructions; an infrared or radio transmitter for at least transmitting a radio wave and coupled to said central processing unit; and a memory constituent coupled to said central processing unit and at least supporting a running software application used to direct the operation of said augmenting touch apparatus.

To suggest by an example, let's consider a user playing a mobile game (or video) with a 360 degree play field on a touchscreen device 22. As the game is designed for interaction of a user's finger atop the 20 screen (and thus, atop the display's 20 graphical rendering as it is being played) to navigate said play field, said design inherently finds the user's fingers and/or manipulating hand obstructing part of the game's on-screen 20 content.

The inventor believes that, under certain circumstances, using the touchscreen surface 20 to manipulate such content is not necessarily the best form of input modality and may not even provide for the most optimum user experience. The present embodiment, therefore, seeks to add the touchscreen device's 22 adjacent housing 21 as an extended, supplementary and/or complimentary touch input surface in attempting to solve this. That is, to overcome said natural obstruction as being but one of the present embodiment's advantages.

This type of novel input disposition can be particularly useful for game playing, first suggested above, as the technology may be paired with an on-screen pointer graphic that can be used for both on-screen orientation and manipulation of actionable inputs in certain operational environments.

Furthermore, a shell's tactile touch points (e.g. one or more shell localities exhibiting recognizable surface anomalies upon contact with a fingertip) can be mapped instantly to graphical buttons or akin representations. Disparate touch surface anomalies may be used to tangibly assist a user with at least touch reference and orientation metrics; although this is not requisite, as mapping may be fully customizable and/or intuitively pre-configured.

The described method of input, can, of course, be combined with other sensors such as, but not limited to, the more commonly used accelerometers and/or gyroscopes in an input environment.

Moreover still, although unillustrated, the housing 21 of a mobile device 22 running parallel with the glass touchscreen 20 insert can be further modified to at least acquire, then repatriate to charge said mobile device's 22 stock battery, the "light bleed" that naturally collects at the edges of the illuminated glass surface. And said housing may be further modified still for free-space optical communication using collected light to transmit data.

As an aside, an electroacoustic device or proximal region thereto, even a touchscreen overlay, may also be modified to complement this type of energy repatriation effort; this time by attempting to harvest, across their acoustically responsive surfaces, directed sound vibrations. Application Ser. No. 14/881,144 titled VIDEO-GAME CONSOLE FOR ALLIED TOUCHSCREEN MEDIA under common ownership of the inventor similarly describes a contained housing for a mobile device designed to harness the piezoelectric movement opportunity (which is wasted in traditional mobile designs populating stores) caused by haptic events for powering said mobile device.

Additionally, and to that point, upon said overlay being communicably linked with the microphone and/or speaker assembly hardware of a commercial smartphone, it may otherwise be designed to intensate any of said directed sound vibrations from said hardware to a sufficient degree such that incoming calls and/or text alerts, in the exemplar, are "felt" by a user with a pocketed phone. That is, without further taxing the battery source by engaging a haptic engine.

And while use of a polymere strucute to develop transparent projection foil technology permitting low-level light to be amplified is known in the field of advanced materials, its described application to a touchscreen environment is unique to the specification. Particularly, as it is applied to the screen surface of touchscreen electronics and/or to the heads of LED/OLEDs to permit users to lower brightness settings a degree without seeing a commensurate performance loss in lumens of the foil-covered display. This too, serving as a power miser agent. The projection foil technology being serviceable for both emissive and reflective mode displays.

FIG. 3 illustrates, in accordance with an embodiment, a simple circuit comprising a surface 30 such as, but not limited to, a substrate with an array of electrically-conductive circuit paths; each member of said electrically-conductive circuit paths is distinctly coupled with a corresponding member of a dense (though, separated) arrangement or array of conductive isolate members 31 equidistantly disposed throughout said surface.

The simple circuit may serve as an inexpensive capacitive touch sensor for controlling, as an example without suggestion of limitation, actionable inputs on an associated touchscreen device 30. Although shown darkened to facilitate reader understanding in this embodiment, each conductive isolate member 31 is, of course, actually applied in a fully transparent manner to the screen surface 30 so as to not occlude the display.

Said simple circuit, of course, being readily combinable with FIG. 2 above; wherein said simple circuit designed for at least sensing touch becomes part of the housing 21 of a mobile device 22. In other words, the mobile device's 22 inner shell 21 itself acting as the substrate for said simple circuit.

In specifically addressing a FIG. 2 combinatorial reboot now, under such a simple-circuit design, the electrically-conductive circuit paths may be strategically applied atop the surface of the (preferably rear) housing's inner-shell or liner using a pulsed laser ablation process, or by any means serviceable, and wherein each of said electrically-conductive circuit paths is therein accompanied by one or more electrically-insulating liners that have been serviceably disposed to said liner ensuring electrical separation among each of said electrically-conductive isolate members 31 and their respective electrically-conductive circuit paths. In this way, physical button points and precise mapping to their soft-button counterparts is conditioned. Said simple circuit's electrically-insulating liners, of course, further ensuring unintended capacitive bleed from finger contact with said shell's exterior does not occur.

Future generations of bendable electronics, such as the rollable screen variety, being equally seamless as adaption fodder. Bendable electronics comprising a glass structure with a thin, hollow vacuum core; hermetically sealed amidst an applied nano coating to modulate current and a reactive plasma component as being further serviceable. The applied nano coatings may be manipulated by fields actually emanating from a specially designed touchscreen device housing itself. While such construction on a nanoscale is, of course, known to the field of advanced materials, a unique approach is hereby presented in addressing improved delivery methods for touchscreen electronics particularly.

More to the point now, each independent conductive isolate 31 of said electrically-conductive isolate members 31—each serving as a unique touch-point or touch-position identifier—disposed on said inner shell is independently and conductively conveyed through to the shell's exterior using a serviceable conductive path and insulation means. Said conveyance, of course, actualizing touch capabilities to the outer shell at registered touched contact points; each being operationally paired with a microcontroller and/or related hardware of said touchscreen device 30.

The incidental area of said mobilized shell in contact with the hand(s) grasping the device can, of course, be disabled by at least said microcontroller—similar to the way the face does not actuate a phone when being applied to a user's face during a phone conversation—and/or similarly designed away from causing unintended input events.

Although not requisite to a shell disposition of a simple circuit, an optional conductive plexus, like an array of organic semiconductors, may be inexpensively disposed to the substrate using an inkjet printer or lift-off deposition process, potentially requiring a masking of the substrates, for supplying fluent touch mapping and interaction properties in the spirit of this discourse.

For a better understanding or a re-familiarization of this disposition, the reader may refer to CIP patent application Ser. No. 14/862,327, to which this disclosure shares a parent lineage, for a better understanding of conductive-path applications for the engagement of actionable objects.

Having established that understanding from a shell perspective, and in further using a non-limiting example, let's again return more concretely to FIG. 3. Each electrically-conductive isolate member 31 comprises a conductive square that is discontinuous 32. In other words, the discontinuous conductive square 32 comprises an electrical break interrupting its electrically-conductive circuit path. To resolve this, a user's finger is applied to said discontinuous conductive square 32, 33. Since the composition of the human body is mostly water, itself a conductor, by touching said discontinuous conductive square 32 it thereby repairs or reconciles said electrical break; thus making the conductive square "electrically continuous", non-interrupted or whole 33.

And since said electrically-conductive isolate member 31 therein is no longer interrupted, it may become active and operationally parsable by at least a linked processor of said touchscreen device 30; and wherein said processor at least interprets and executes program and/or control-based instructions accordingly.

Videlicet, upon an isolate member 31 (a mappable region) becoming electrically continuous 33, the occurrence is registered by the apparatus as a geographically distinct touch input event (that is, it is defined by said mappable region) and thus concludes with an on-screen actuation event based on the registered mapping relationship of this distinct or defined point of touch origin and its soft input counterpart.

The technology of said simple circuit, of course, is designed to be activated by—or be associated with—the use of simple touch, long press, hard press, tap, swipe, pinch and/or the like commands by a user and fully supports multitouch.

Arrays of conductively-disposed isolate members 31 may be further tweaked for higher sensitivity registration where coveted and may, for instance, comprise a material with manipulable levels of electrical resistance for improved sensitivity-based mapping by the sensor architecture.

According to the described touch structure, then, the reader will note that a clear demarcation exists between the present invention and traditional touchscreen hardware that relies on a traditional relationship of registering touch: wherein decreasing the distance between two conductive elements (separated by a dielectric) causes a measurable increase of capacitance, as is popularized by today's smart touchscreen devices.

Sensing metrics of a retrofitted touchscreen device employing said simple circuit or akin method may be, as a case in point and without suggestion of limitation, associated with at least one of a sensor panel, a diode panel, a transistor panel, a graphene panel, a flexible membrane-based transistor assembly (e.g. using etched cavity-like patterns for communicative throughput of a touch location; in future iterations an etched touchscreen glass surface lending itself to such applications, including a yielding doped structure), one or more magnetometer chips, a semiconductor array, an array of atomic magnetometer sensors, one or more current modules, including a current transformer, one or more Hall-effect-based linear current sensor ICs, ATP nanotubes, a carbon transistor assembly, one or more magneto-resistive chips and the like. As to this retrofitted embodiment, a highly inexpensive semiconductor polymer coupling, designed to act as a magnetometer, is coterminously embedded beneath a glass surface and used without suggestion of limitation.

Each of the preceding listed members being capable of positionally sensing the tiny amount of electricity or load in the human finger and/or when a finger is placed upon a discontinuous conductive square (and thus making it electrically continuous 33, non-interrupted or whole) depending on a design impetus. A low-voltage device load to the sensors, such as in the milliampere range, may be required for some operational designs in sensing electrically continuity 33, although redesigns exist.

Incidentally, the reader notes that ECG or EKG tests that record a heart's electrical activity are well-known examples of the human body producing said tiny amounts of electricity (e.g. acting as carriers for nervous signals). The bone matrix of a human also known to produce a current; although producing potentials of opposite polarity to that current produced by the nerves.

In low-voltage device load designs, voltage loads may be provided, for instance and amongst other serviceable means, using a solar or kinetic energy means. Even a means whereby finger capacitance is stored by a specially designed housing shell that uses a repatriation process to trickle charge the device as it is being held by a user. This technology paving the way for using capacitance-based battery designs (again capable of, for instance, receiving a degree of charge from communicable association with a user's hands) to produce degrees of electric energy for powering the handheld devices in which they are embedded.

Moreover, with said simple circuit technology embedded into a device's casing and used as an auxiliary input means, on-demand enlistment may thence be configured; wherein said shell, specifically the active controller regions of said shell, are only mobilized just prior to mobile game play.

Although such a characterization is not intended to suggest limitation to handsets and/or game play, as the discoursed simple touch interface of the simple circuit—or serviceable brethren within its afforded scope—can be applied to a variety of contact surfaces traditionally not associated with touch control interaction.

Incidentally, the inventor believes, exempli gratia, the present invention has marked potential to add value to a user experience and prove relatively seamless, with little added expense and at marked cost efficiencies, to incorporate into existing phone hardware designs by "tapping" into their existing tracking hardware and related circuitry. In fact, the inventor believes the proposed interface means—with a few, likely minor, variations and/or modifications falling within the scope of the present invention—may even potentially serve as the primary touch-interface means for a new generation of less expensive handsets deftly targeting emerging and pre-emerging economies.

FIG. 4 illustrates a sampling of conductive game pieces 40, such as, but not limited to, players, characters, pieces and pegs 44 for use with tablet-based 42 electronic play boards 41. Videlicet. The melding of the physical in traditional tabletop and/or board games with the electronic.

The use and assembly of a plurality of planar puzzle pieces 43, with and without RFID functionality, comprises an initial focus of this exemplary illustration. The present invention espousing the rote course of assembling (now conductive) physical puzzle pieces 43 with the rife interest of a touchscreen platform 42 for user amusement. Peg hardware 44 comprising a latter, non-limiting focus of FIG. 4.

More particularly now, mechanically cut cardboard puzzle pieces, typically associated with the art, are replaced herein, by interconnectable conductive puzzle pieces 43 capable of interaction with a touchscreen's surface. Said puzzle piece 43 members may be paired in a side-by-side abutting relationship, a vertically stacked relationship and/or a locking relationship similar to application of the Lego® brand.

To wit: the interconnectable pieces 43 are used to compose image-driven art, pictures, effigies, shapes, indicia, block sculptures, etcetera, and designed for application to a touchscreen surface, such that, upon application, may assume the screen's display imagery, colors, printed indicia and/or a combination thereof for producing a synergic effect. That is, in collectively acquiring, defining and/or enhancing recognizable images. And forms. The above configuration readily permitting disassembly and use of 3-D building pieces exhibiting robust illumination properties.

Furthermore, for more spirited effects, a puzzle piece 43 may be coated with at least one of an electroluminescent agent, hydrochromatic agent (e.g. a water droplet on a finger reveals indicia as a form of moisture sensor) and a modified superfluid or epitaxial film, electrostaticly applied, to induce light flows for the generation of tiny forces and/or haptic associations perceived by a user upon application. For instance, upon sensor detection of the application of a conductive piece 40, 44 to a screen 42 surface, a software program may flash the applied area with light to generate this incidence of said force.

Nanosheet and electrolyte nanosheet pluralities used in series, use of nanoclusters, nanofluids, transparent nanotube and carbon nanotube fibers and yarns may also be considered for the construction of touchscreen-based input hardware et al in a suggestion of breadth.

To suggest differing on-screen applications of conductive amusement pieces 40, without a suggestion of limitation, puzzle pieces 43 can readily be replaced by varying shapes and sizes of non-abrasive, illuminating peg hardware 44 for strategic application to a touchscreen's surface. The peg hardware 44 being used for "drawing" objects under the varying (e.g. based on a pressure-sensitive input) light and/or color illumination of a touchscreen's 42 display.

Said illuminations are punctuated by the illuminating properties of said peg 44. In effect then, the physical play pieces 40, 44, conductive in nature to permit the capacitive throughput of a user when interacting with a touchscreen 42, permit for a potential transmutation of such classics as, but not limited to, Hasbro's® Lite-Brite toy into the modern world of digital amusement. An impetus the inventor hopes can be successfully commercialized to help bring more families together again under the once-popular banner of family night or game night.

And in a suggestion of breadth by example, said pegs 44 may be configured with miniaturized electronics (e.g. piezotronics using ultra-fine wires) that are powered by minute sources of piezoelectricity occurring from application stress caused by (gentle) application of said peg 44 to said display's 42 surface. A molybdenum disulfide layer, or the like, that forms a thin, compressible dielectric layer of independent conductive isolates may be used to enhance the effect.

Moreover, one or more drawing implements, such as, but not limited to, a conductive brush, stylus, pencil, plotter and finger may further be introduced to said electronic play boards. The reader notes that operating scenarios can, of course, vary widely from those embodiments disclosed herein while still remaining faithful to the operational concepts advanced by the inventor.

FIG. 5, in accordance with an embodiment, is a drawing of a head-mounted and limpid display controller 50 comprising a transparent display 51 or visor 51 with a durable, touch-sensitive conductive circuit 52 (also transparent) dorsally applied to its surface and used for controlling actionable objects by touch 54.

Said head-mounted and limpid display controller 50 includes a main body defining a space for comfortable attachment to a head region of a user by straps 53; with said transparent display 51 component coupled to the main body of the head-mounted apparatus 50 for providing unobstructed, adjustable access to a wide field of view during operation. The head-mounted and limpid display controller's 50 structure, as above, supports manipulation of said display 51 component by a user 54 and houses a deft speaker and microphone 55 assembly comprising current state-of-the-art audio enhancements.

The head-mounted and limpid display controller's 50 structure further supports at least one of a servo assembly, one or more camera sensors for at least mapping pupil direction, one or more ancillary hand-controllers 56, one or more location and/or orientation sensors and one or more thermal sensors for at least mapping topographic touch in a gaming environment.

According to the described structure, a durably transparent and printed conductive layer 52 is applied—preferably distributed throughout said display's 51 dorsal surface—and comprises the touch-sensitive conductive plexus 52 which is unique to the art. Since the screen 51 is designed to be controlled by at least the capacitive touch input 54 of a user, with every human exhibiting a characteristic of capacitance, said plexus 52 is disposed to said dorsal surface in a manner that promotes fluent use of touch regions without obstructing anterior on-screen content.

For instance, the plexus 52 comprises a uniform, equidistant pattern of independent conductive tiles or isolates 52, with each tile 52 approximating the dimension of the span of a fingertip. Each tile member 52 comprising its own electrically-conductive circuit path and electrically-insulating liner respectively, ensuring an autonomous conductive path is present, that leads to an electronic circuit for routine mapping processing; said tiles 52, heretofore taught, thence capable of acting as active touch regions 57 for precise control throughput.

Each conductive tile 52 member of the dorsally applied touch-sensitive conductive circuit or plexus 52, by nature of design, comprises a geographically identifiable 57 mapping constituent in a control gesture or gesture series and affords the user a familiar interaction schema in a touchscreen controller environment.

The display 51 unit of said head-mounted and limpid display controller 50 is disposed for anteriorly receiving a light source (e.g. a projection source) of preferably at least 90 fps for visual registration to the eyes of a user and effectively serves as a display 51 on one side and a capacitive touch-input control panel 52 on the other side as per the above structure.

Namely, said capacitive touch-input controller interface, the plexus, 52, accessed dorsally and associated with an electronic circuit to further direct originating capacitive entries 52 by a user 54, sees each tile member 52 "hovering" over a geographically specific display 51 region associated with (anterior-based) interactive projection content. This "hover" state permits a precise (also a direct) mapping relationship for real-time control of actionable touchscreen objects viewed by a user. This, again, is because said display content is disposed directly opposite the one or more actuating touch regions 52, 57 of said display 51. The conductive plexus 52 may be dexterously used for headsets 50 using stereoscopic split screens.

As robust as the presented technology is, said head-mounted and limpid display controller 50 still offers a considerably more minimalistic electronic and energy footprint than current VR headsets. Although the reader understands that said headset 50 comprises a full electronic footprint of required hardware, not necessarily annotated in the figure, to permit for the fluent control, mapping and display as discoursed.

Use of a light combiner, optical diffuser and microdisplay, although merely exemplary and not suggestion of limitation, may be further embedded in the body of said head-mounted and limpid display controller 50.

The transparent-display 51 structure as above may be comprised of a shaped synthetic or natural organic material designed for resistance to touch-based blemishes and for efficaciously manipulating a light source (e.g. from an attached pico projector, microdisplay, serviceable display and/or like source) for visual registration with the eyes of a user. One or more additional transparent screen displays 51 may, of course, be used in a series to first receive, and then relay, a projection to said main display 51 structure or vice versa. This may be used, for example, to effect different perceptions and depth dynamics under certain controller environments.

The presented technology may also be used with ancillary controller complements 56, wearables and even a TENS (Transcutaneous Electrical Nerve Stimulation) patch developed by the inventor. Battery operated and linked to the head-mounted apparatus 50, herein described, by an infrared or radio transmitter, the TENS patch provides safe muscle stimulation to a manipulating hand or hands in response to a game and/or controller event. It may also comprise a radio frequency (RF) or akin means to manipulate temperature sensations to the hand wearing said patch, a dedicated motion-sensor means and a fine-filament braid comprising at least copper for input events based on one or more distortion events as per the earlier specification's teachings.

Thus, an embodiment once more putting a different spin on touchscreen-based haptics by the inventor. Beyond the obvious operational utility this patch may present the user, certain gaming apps (e.g. those using micro-transactions) may be used to further unlock additional input functionality, control dynamics and gameplay advantages of said patch in relation to a controller ecosystem.

The reader notes that although the plexus 52 is shown darkened to facilitate reader understanding, as suggested earlier, each conductive isolate member 52 is applied in a fully transparent manner to the screen surface 51 of an exemplary head-mounted apparatus 50 in accordance with this illustration.

The reader may, of course, again refer to CIP patent application Ser. No. 14/862,327, to which this disclosure shares a parent lineage, for a better understanding of conductive-path applications used for the engagement of actionable objects.

FIG. 5A is a drawing of a dynamic projection surface 500 comprising an elastic and taut membrane 501 and an equidistant, spring-mounted rod assembly 502 contactually associated with said membrane 501; said assembly 502 capable of excitation under a manipulating field and used for producing varying screen surface levels (front to back) from a planar line on said taut surface 501.

This exemplary form representing a potentially promising interface for future pliant touchscreen displays (e.g. rollable and/or flexible), particularly, although non-limitatively, using any of a serviceable variety of micro assemblies 502 designed for pixel and/or region-specific manipulation of a surface, from a planar state, under any serviceable excitation means.

The serviceable excitation means and excitation assembly means embodied by these teachings may, of course, be prone to wide variations from that which is disclosed both figuratively and literally; whilst still remaining faithful to the described operational concepts.

To accommodate touch sensitivity for the varying surface depths under an embodiment of touch manipulation, both a capacitive and thermal touch interface (e.g. using a heat sensing camera to detect surface anomalies in a controller environment) may be used.

Similarly, an excitable flexible glass and/or plastic fiber apparatus—for use as a directional light engine—may be designed for creating a polycephaly and waggled light influence means through the omnidirectional manipulation of each of said fibers directing a light source.

FIG. 5B illustrates a visual feedback display mechanism 510 of a VR headset controller 515, comprising a dynamic motion influence 511 means (e.g. of an oscillatory or rattle reflex), that intends to do for the sense of sight in a game environment what haptic feedback has done for the sense of touch in the same; wherein a visual feedback event of said visual feedback display mechanism 510 occurs in response to a game event.

The display 512 of said visual feedback display mechanism 510 is made adjustable in relation to a user's eyes and wherein one or more of a/an electromagnetic, pneumatic, hydraulic and akin means is/are used to permit said adjustments 511 to occur freely and in synchronization with signals produced by a game-event.

According to an example structure set forth, a non-limiting electromagnetic 517, 519 adjustment means 511 will be selected for this illustration. For the above-listed and any akin adjustable 511 means not discussed particularly, those skilled in the art will recognize a serviceable disposition of hardware necessary to create said ocular effects using an alternate drive system for said adjustment 511 means.

A visual feedback display mechanism 510 includes a main body 513 defining a space for attachment to a head region 514 of a user over the eyes, a surrounding frame at least comprising a tuning knob 516 and a transparent display or visor component 512 coupled with said visual feedback display mechanism 510; itself being coupled to said main body 513 of said VR headset controller 515. The display unit 512 is designed to provide unobstructed access for a user's field of view during operation (or, diversely, of a panoramic field-of-view of a display system that restricts viewing to an outside environment where so designed). For such enclosed display systems, explicit product safety guidelines should be followed faithfully by a user to ensure safe operation of a headset in said restricted room environments.

The transparent display 512 may be designed to reflect light-based sources for ocular registration and is associatively coupled to a first magnetic assembly 517 (an electromagnet that is free to oscillate) that is placed in front of a fixed second magnetic assembly 518 (i.e. a permanent magnet fixed firmly in position) associated with said main body 513.

The floating electromagnet 517 assembly, disposed throughout a rectangular cone 519 thereof, runs parallel with a user's field of view during game play; said electromagnet assembly 517 may comprise a nested metal coil for creating a magnetic field when an electric current is applied and is prone to creating a reversible magnetic polarity when the direction of the current is reversed for deftly creating said adjustments 511.

As pulses of electricity are applied to said coil 517, its magnetic field, naturally, rapidly changes directions: thus repelling from, and attracting to, said permanent magnet 518. This vibrating, back-and-forth force and/or motion is used to reposition said display 512 to the path of said vibrations (i.e. it produces an adjustment 511). Visual effects are thence manipulated of user consumption.

To introduce a game example: as a golfer in a golf game hits a golf ball the course background (that is, the display unit 512) will oscillate 511, an inch or two forward first—in a representative but non-limiting suggestion—and then back to a position of rest a short interval later, to visually reenforce a game event. An omnidirectional motion or "rattle" of the screen 512 in an alternate iteration, amongst other serviceable physical motions said display screen 512 may be subjected to, serve as further motion fodder 511 in accordance with these teachings. This disclosed, without suggestion of limitation.

In this particular instance then, accordingly, the visual feedback display mechanism 510 is tied to the "ball impact" of a golf swing. The ball impact, indeed, being but one, non-limiting example of a serviceable game event for this technology. Said vibrations and/or adjustments being highly tunable in a controller environment.

FIG. 5C describes use of a tunable color apparatus comprising an antecedent polymer membrane 520 comprising a chromatic means (e.g. one exhibiting an electroactive, magnetochromic, crystallochromic, biochromic, photochromic, thermochromic, gasochromic, solvatochromic, vapochromic, aggregachromic, tribochromic, ionochromic, halochromic, piezochromic, radiochromic, mechanochromic, cathodochromic, chronochromic or electrochromic state, the latter term being used throughout this figure for example consistency in a non-limiting sense) designed primarily to replace the traditional color wheel used in traditional projection systems. It is preceded by a light source 521 for generating white light that is positioned to shine through said antecedent electrochromic polymer membrane 520.

The discoursed antecedent electrochromic polymer membrane 520 may be at least designed to switch, at intervals in the millisecond range, between serviceable colors based on an electrochemical redox reaction (which can be made stable with counter-redox agents, such as, but not limited to, ferrocene) and an introduced low voltage 522. More particularly, this tunable color apparatus 520 is capable of rapidly alternating between the primary colors of red, green and blue. As said white light source 521 is cast through the rapid, electrochromicly-induced cycles of primary colors on said electrochromic polymer membrane 520, the primary colors of light are respectively created at any particular instant.

Elements of electrochemistry, which entirely underlie electrochromism. According to Corning Inc., as per U.S. Pat. No. 8,118,987[1] "Electrochemistry is a branch of chemistry that deals, in part, with processes occurring on surfaces (i.e., electrodes) due to interplay between electrical and chemical effects. This field encompasses a variety of phenomena and applications of technological importance including electrocatalysis, corrosion, batteries, fuel cells, double-layer capacitors, electrochemical sensors, electrochemical synthesis, electroplating, electrophoresis, electrochromic displays, etc. In many of these applications, surface processes can be manipulated by controlling the potential or the current of one or more electrodes in the system."[1] $^{Col.\ 1\ Lines\ 19\text{-}30}$ Use of one of one or more associated mirror chips, LCD panels and/or a postliminary membrane 523 comprising an array of electrochromicly switchable mirrors 524 is to follow—the latter modality replacing (or in other iterations, hybridizing) the traditional mirror chip and LCD panel hardware and being the focus of this continued discourse without suggestion of limitation. Each mirror 524 of said array of electrochromicly switchable mirrors 524 is capable of being turned either on or off at any particular instant according to the need for color at that moment in generating a projected picture 526. Subtractive color mixing, known to the art, may also used to enrich the pixel color spectrum and offers the embodied projection system at least a comprehensive chromatic and gray-scale base for the creation of felicitous colored pixels in a projection 526 environment.

While electrochromic agents of change are, of course, known to the art of electrochromism, the present invention discourses differentiation by quadrating the technology for the creation and commercialization of electrochromic pixel agents for a new field of electrochromic projection devices and/or VR headsets, to name a few operable platform kin.

More particularly now, construction may include an inner peripheral surround housing said antecedent electrochromic polymer membrane (a substrate) 520 and said postliminary membrane (also a substrate) 523 hosting the array of said electrochromicly switchable mirrors 524 used for generating pixels to a lens unit 525 downstream. The lens unit 525 being potentially interposed by a dielectric spacing capable of absorbing movement of an associated deformable region of some electrochromicly switchable mirror 524 designs.

Each electrochromicly switchable mirror 524 of the array may include said deformable region which is capable of controlled swiveling (e.g. to provide direction to a heat sink or for the act of pixel generation) under an excitation by at least the electronic circuit 526. Each member 524 of said array of electrochromicly switchable mirrors 524 therein may be activated on/off by said electronic circuit 526 in synchronization with said antecedent electrochromic polymer membrane 520 to generate a precise pattern of red, blue and green pixels used for forming a projected picture 526 downstream (first collected and focused by a lens unit 525). The projected picture 526 is cast on a receptive projection screen surface of a VR headset controller 515 or any other serviceable projection screen.

Conversely, each electrochromicly switchable mirror 524 of the electrochromicly switchable mirror 524 array may readily be re-designed, with specific focus to its act of turning pixels either on or off, in accordance with a second embodiment. For instance, each of said mirrors 524 may be independently configured, through use of a plexus interface or by any means serviceable, to rapidly toggle pixel regions between reflective and transparent states based on an excitation means.

Reflective states potentially directing light to a heat sink while transparent states potentially directing light to the lens unit 525 for comprising an image 526 without the need for an impelling deformable region. This "pixel-tuner matrix" 523 thence acting as a gatekeeper and/or manager of light 521. To avoid any instances of the screen-door effect in a diverse iteration, a tiny amount of light bleed may be permitted between the neighboring switchable mirror 524 array members using specially-designed edges.

Field mediation sources comprising said excitation means may also, of course, include such forces as magnetic and gravitational fields. A user's own biofield, in fact, may also potentially serve as a model for future generations of touch and display interfaces. Further to this point. Any interconversion and/or use of energy including mechanical, thermal, electrical, electromagnetic radiation and chemical is/are admittedly also included in the spirit of this invention for any electrochromic or like quadrating structures.

To address the impact of air and moisture sensitivities of the potential components of the flexible substrates (e.g. a transparent substrate used in any serviceable display), at least one of encapsulation, microencapsulation and hermetic technologies may be used and the delivery methods may comprise at least one of a bio-delivery method, a liposomal method, a polymersome method, a monodisperse method, a hydrophilic and hydrophobic method, a macrocyclic oligomeric material method, a mesoporous method, a liquid silicone deposed material method, an emulsion method, a flexible ceramic method and an organic material method, to name a few.

To address the impact of stress sensitivities precipitated by the flexible components (or, for example, surface-based conductive depositions impacted by flection) of the flexible substrates and/or display elements, one or more of the following may be used, to name only a few non-limiting examples: thermoplastics, titanium polymers, flexible conductive nanocellulose materials fused with silicon nanoparticles, semi-crystalline copolymers such as Poly(vinylidene fluoride-co-hexafluoropropylene) which has excellent thermal stability and stress crack resistance under a large number of stress cycles.

Further still, one or more of the following may be introduced to the embodiment in consideration of stress fatigue: thin-film sensors and elastomeric-film sensors (e.g. a construction capable of softening under stress) configured to resist fracture and endure a large volume of stress cycles; printable graphite; exfoliated graphite; fiberglass strains; epitaxis-based crystal electroactive polymers; and tangential-based and fluid-immersed display structures.

In a suggestion of breadth in re: the preceding reference to fluid immersion, by providing a deoxygenated base and/or application for base materials, as an example used to foster reader insight, certain suspensions in a fluid (e.g. water) may no longer degrade or oxidize (or slow, suppressing the oxidation rate) and can thence be suitably transferred to a silicon substrate for improved dynamics in certain operational environments. This in a suggestion of serviceability. Hydrophobic compositions also being serviceable to the present invention and used without suggestion of limitation.

The plurality of independently controlled electrochromic polymer membranes 520, 523 may be assembled as layers and/or as layers between transparent dielectric members. Moreover, electrically chargeable LCD films may also be applied as layers for further manipulating viewable states.

Returning to the above-noted inner peripheral surround, it comprises a concealed, chargeable voltage source 522 for substrate 520, 523 (524) stimulation and further comprises a full complement of electronic hardware 526 necessary for at least interpreting and executing a decoded signal (from an associated touchscreen device, TV receiver, computer, disc player and/or the like decoded by an electronic circuit 526 inside said housing) to be used as the embodiment's projection content 526.

A design goal of the present invention, particularly the described electrically tunable electrochromic structures, is to create a substantive advantage in the construction of notably more energy-efficient, compact and/or lightweight structure for at least headset 515 and/or projection 526 hardware. This, without suggestion of limitation.

Further, the present invention may be modified around a LCoS model to comprise a single electrochromicly switchable mirror for each primary color (or an equally apportioned membrane region of the same) that is actively shielded by a liquid crystal matrix. Unlike the current LCoS or DLP models, however, the present invention, once again, differentiates itself by now creating a chromic matrix 524 as the active shield based for its perceived design advantages. Particularly then, important to the framework of the present invention is the use of an electrochromic or like means to replace both the primary color wheel and/or to replace the active shield means of traditional projection systems. More particularly still, combining a primary-color electrochromic means with a tunable electrochromic mirror matrix means to produce a new wave of promotive technologies.

Serviceable color-wheel replacement of the electrochromic projector series described above may also include alternate deployments such as, but not limited to, the use of flashing LEDs including those using RGB color mixing, bi-color and tri-color LEDs (e.g. a tri-color single bulb LED with rapid light cycling occurring between at least a primary color palette), RGB LEDs, Digital-RGBs and decorative-multicolor LEDs, to name a few. Specialized thin-film LED substrates may also be configured to assume a physical likeness to said electrochromic polymer membrane 520 for broader pixel manipulation.

FIG. 6 illustrates an optically rapt, photorefractive apparatus 60 comprising a bismuth titanium oxide, bismuth titanate or other serviceable material. In a subjugated environment, the photorefractive and electrooptical effects of said rapt apparatus 60 may be manipulated under an applied electrical field 61, magnetic field or by illumination 62 in order to achieve visual effects 66. While bismuth titanium oxide and bismuth titanate are, of course, known in the field of advanced materials, novel applications for headset electronics, particularly, are herewith presented.

A smartphone, tablet or mobile touchscreen-device build is shown in FIG. 5E; particularly, depicted is a cross-sectional view of the interior volume of the smartphone.

Being more particular still, disposed inside the mobile device housing are, as indicated, a stacked circuit board component with a more compact space requirement (ie. a smaller footprint) than a traditional circuit board component the stacked circuit board designedly replaces; and a corresponding non-traditional battery component.

Whereas, in a non-limiting example of the non-limiting FIG. 5E, despite 552 having half the circuit board length L2 as that of the circuit board length L1 of 551, the reader notes the L2 circuit board still comparatively provides the same circuit-board surface area (because of its stacked assembly at (20 layers)) for mounting electronic components on as that found in the L1 circuit board at only (10 layers). The compact, space-saving structure of the stacked board (ie. its smaller footprint L2) substantially creating or freeing up absorbable space S1 (as indicated by the solid-dashed line) in the 552 mobile device build when compared to the traditional 551 L1 build (cf. the difference between L1 and L2).

The non-traditional battery component is designedly configured to absorb the freed absorbable space S1 as indicated, at least partially; resultingly and comparably, its size and battery capacity from a single charge is substantially augmented (S1) with the extended build (indicated by the solid-dashed line) under the present invention.

The oddly shaped and configured battery and the stacked circuit board components, in an embodiment of the present invention, are made to interconnect or fit together like puzzle pieces. As is exemplarily depicted in FIG. 5E. The 553 mobile device build, for eg., shows an L-shaped configuration of the battery and the stacked circuit board assemblies.

Accorded to an embodiment, given the microstructuring nature of the stacked Substrate-like PCB (SLP) in FIG. 5E, the structure is well disposed to utilize, without limitation to, additive lithography processes (adopted from IC substrate fabrication practices) to form circuit traces with higher precision and in straight vertical lines (inherent to lithography) than a traditional mobile device mainboard PCB which uses subtractive manufacturing. Videlicet, having feature sizes close to that of an IC substrate; as achieved by adapting and integrating technology of the same for truncating the printed circuit board's capabilities gap in relation to the IC substrate.

A typical SAP method forms a pattern based on lithography using a photoresist on a substrate material to which a metal seed layer is thinly stacked by sputtering, chemical vapor deposition (CVD), electroless plating, etc. Both the SAP and MSAP method replacing a traditional subtractive PCB manufacturing process. A typical MSAP method having a thin layer of copper being coated on a substrate and followed by a negative pattern design (e.g. a photoresist pattern may be a negative photoresist of a lithography process well in possession of the specification). Copper is then electroplated to the desired thickness and the seed copper layer is removed, for example, with etching (i.e. mSAP, which utilizes additive process steps from substrate technology to create the circuit pattern, is combined with subtractive layers according to an embodiment) to thereby form a circuit having a very fine pitch. Rather than simply subtractive process steps for High density interconnect PCBs, for example.

The original specification providing support for the above methods through at least one of express, implicit, or inherent disclosure. Observe a semiconductor lithography, for a non-limiting example. "To build the complex structures that make up a transistor and the many wires that connect the millions of transistors of a circuit, lithography and etch pattern transfer steps are repeated at least 10 times, but more typically are done 20 to 30 times to make one circuit."[2] *para. 2* [2] http://www.lithoguru.com/scientist/lithobasics.html "There are three basic pattern transfer approaches: subtractive transfer (etching), additive transfer (selective deposition), and impurity doping (ion implantation)."[2] *id.* . . . "Additive processes are used whenever workable etching processes are not available, for example for copper interconnects. Here, the lithographic pattern is used to open areas where the new layer is to be grown (by electroplating, in the case of copper)."[2] *id. 8. Pattern Transfer* [2] e.g. a semi-additive copper patterning for a lithographic structure. Both Semi Additive Process (SAP) and modified Semi Additive Process (mSAP) use additive process steps for fabricating an electrical circuit of high quality on a printed circuit board, including a rectangular shape of the wiring. The reader also recalls at least para. [0080] herein teaching, as a non-limiting example, a lift-off additive process, most commonly used to create metallic interconnections, and more particularly a lift-off SAP within its scope; and whereas an electric circuit is an interconnection of electrical elements.

"Under the doctrine of inherent disclosure, when a specification describes an invention that has certain undisclosed yet inherent properties, that specification serves as adequate written description to support a subsequent patent application that explicitly recites the invention's inherent properties." (citing Kennecott Corp. v. Kyocera Int'l, Inc., 835 F.2d 1419, 1423 (Fed. Cir. 1987))

According to one embodiment (not the subject of illustration), the rapt apparatus comprises an array of tiny bismuth titanate lenses, equidistantly spaced and constructed to bifurcately pivot under the oscillation of an applied field, for manipulating a nether media source. Said pivot produces the appearance of an undulated, moving image (ergo the output) between a left and right eyepiece of bionocular hardware and is thus suitable for stereoscopic headset environments.

Oscillation of the rapt apparatus may also be administered using sound vibrations to manipulate said array of lenses' position for the act of creating said moving or toggling image. This oscillation is to occur at a frequency where the toggling images are not perceived to flicker and, of course, the angulation of the lenses are such that slightly different vantages of the same image appear between eyepieces in order to promote the illusion of 3-D depth.

Returning now to the figure. A piezoelectric optically rapt, photorefractive apparatus 60A, with excitation areas that can rapidly expand and contract in response to cycles of electrical stimulation, is shown particularly. As a light-shaping unit, a lattice structure may be configured to support an equidistant plurality of electrically-stimulatable regions 63 (e.g. each dot comprising an independent electrically-conductive circuit path used for controlled excitation of an associated region) are presented.

A pulse of controlled excitation targeting a dot 63, for instance, causes the associated region to first contort 64 and then reset (to a natural resting point) at said targeted stimulus or dot point 63. Controlled contortions (e.g. flex-to-planar 64 or ripple-to-planar 65 physical biases are shown in the exemplary) and their implications for dynamic light-shaping and/or light-manipulating in a gaming environment being the embodied impetus.

The piezoelectric optically rapt, photorefractive apparatus 60A may further be magnetically treated on both sides to permit both controllable compression (using opposing magnetic forces) and expansion of the photorefractive apparatus' 60A thickness for desired light-based visual effects 66.

The reader understands, of course, that the exemplary manipulation of purposive materials are not limited to the design of photorefractive mediums as per above and, amongst a further swath of diversity, may be transitioned to the transmutation of a touchscreen's glass surface where serviceable.

Although not illustrated, material aspects of the present invention follow. One is to transmute a touch display to promote tactile registrations at touch points. Manipulation of crystal structures by a magnetic field, for instance, may be designed to surface tiny physical anomalies on a touchscreen's surface that form tactile references at the equipped touch points. This, of course, is in direct contrast to traditionally smooth touchscreen surfaces.

Molybdenum disulfide, an optically transparent doping agent, may similarly be added to a touchscreen's glass structure to promote a more elastic surface responsive to mechanical stress (example, a finger press on a flexible glass surface). Such a structure may also be modified to serve as electronic switches to further reduce the form factor of the device to which it is disposed.

Moreover, as a case in point, glass touchscreens—as they are traditionally constructed—may see a marked re-design process wherein glass structures are manipulated to comprise certain crystal concentrations, such as, but not limited to, sillenite, synthesized bismuth ferrite, bismuth titanate and/or doped crystal structures, etceteras, for the promotion of visual effects 66 in a user 67 environment. Modifying the glass properties of a touchscreen using a bismuth titanate agent, exempli gratia, tweaked to be transparent in nature and for modeling above-surface holographic impressions, being serviceable to this embodiment.

To serve as a continuing example: a light glow, one appearing to proximally hover above the surface of a touchscreen, may be created by adapting a crystal structure, for the construction of said touchscreen surface, to outwardly manifest the inward LED/OLED light source. The resulting light glow is designed to produce a proximal aura of one or more actionable objects at their complete illumination points when viewed by a user 67 at the correct angle.

Overlays comprising photochromatic properties applied using vapor deposition techniques, phosphors, including efficient luminescent phosphors under UVA, IR and e-beam excitation and those with the addition of trace amounts of dopants to dispose emission centers, may be used in an adjunct manner, quite complimentarily, to provide for light-powered glow effects, amongst others, where desired. Such effects may be coveted, for instance, in certain gaming environments and under low-level lighting scenarios.

A photonic touchscreen surface, under an exemplary application by design, comprising a photonic crystal structure of one or more concentrations may be configured to reflect, emit and/or transmit wavelengths of light from at least a portion of electronically displayed images on a touchscreen device's display, serving as the photonic crystal's light source, and thus may serve to modulate light for a desired visual effect. Said crystals may remain dormant until activated in play environments.

According to a variant iteration, said crystals may, too, be fashioned into autonomous, "floating pixels" or "pixel regions" (e.g. a transparent glass pore structure) and configured for producing varying surface levels and/or visual effects on said touchscreen surface as a result of a field excitation or like means.

The use of one or more of bioluminescent-based materials that produce light as a result of a chemical reaction with oxygen, radio-luminescent materials, collinear light beams of different wavelengths in an interaction series, agarose deposition base media, magnetized media, chemiluminescence, phased array optics, microfluidic chips, conjugated electrochromic or electroactive polymers (e.g. those with and without multi-color patterns), heterocyclic monomers, polyurethane and ionic liquid compositions, crystalline liquids, $WO_3$, ITO, AZO, Nafion, ferromagnetic aerogels (with ferroelectric materials also being serviceable), gel matrices, DNAzymes, protein structures, plasmon fields, chromophore, chromatophores, phonon excitation of a plasma crystal aggregate, iridophores, leucophores, ferritin-based nanoparticles, electro-osmotic membranes, cryptochrome depositions, photopolymer resins, photochemical agents, photoelectric sensors that vary a modality in response to incident radiation and photocurrent-based strain sensors are also non-limitatively listed for their visual-effect serviceability in dynamic display environments within the spirit and scope of this invention.

Anti-stokes phosphors and the use of two-way mirror technology to "flip" or "traverse a displayed image" from an angled, antecedent reflection in a series being further serviceable to creating anomalous light effects for controller environments, generally and touchscreen controller environments, particularly. A two-way mirror, of course, using a half-silvered structure that functions as a mirror on one side and a translucent viewing plane from the other.

FIG. 7, in the exemplary, depicts an arced projection screen 70 at the anterior of a projection-screen series and a second flat-screen 71 at the dorsal end of said series. Each screen 70, 71 member is conjoinedly disposed with an isolating member, such as an air dielectric, providing separation between the conjoined screens. Said series being used for collectively manipulating light 72 from a projection source to promote, jointly and without the need for active or passive glasses, the illusion of 3-D depth 73 of one or more actionable objects displayed by the series. That is, one or more actionable objects are projected 72 unto and through said array of screens for the promotion of said illusion.

The presented multi-screen structure, of course, being suitable for diverse hardware and cross-platform environments beyond the use of touchscreens.

Although not the subject of illustration, an experimental projection surface comprising an array of tiny, transparent and equidistantly arranged lenticular members—extending bilaterally beyond the planar surface of at least one screen member—was tested to manipulate a light source in accordance with an alternate embodiment. Using this deployment, as the present invention sat suspended from a ceiling mount, the inventor was again able to observe a 3-D state 73 of the projection 72 content using only his natural vision.

In a suggestion of breadth, at least one screen member of the series may be comprised of one or more of arched, angular, asymmetrical, curvilinear, spasmodic, variable and excitable surfaces and/or surface regions, etcetera; wherein each member, again, is designed for receiving a traversing exposure of light from an associated projection source 72. The screen peculiarities listed providing contrast to a linked planar screen surface of the series that occurs downstream in this example.

Further, supplementation may include the use of transparent rectilinear monofilaments, equidistantly disposed, as omnidirectional projection surfaces. Further still, anomalous projection surfaces, for instance those changing surface depths as described by the inventor, may see depth variations based on at least one of an Application Processor means, excitation means and a screen contact means such as with light and/or a user's touch.

Although not the subject of illustration, and in a preamble to understanding said projectionary exposure, the product of projected light may result from an arrangement of certain projector hardware that may include a lamp, prisms, beam splitter, lens and/or reflective panels. Or embodied diversely still, it may include an arrangement of a lamp, color wheel, mirror chip and/or a lens assembly. Dichroic prisms, dichroic and regular mirrors and a projector lens may, of course, also be part of the operational environment and are well known in the art. The reader notes that said lamps, traditionally associated as light sources, may readily be replaced by lasers (e.g. for brighter output distributions and more controllable light wavelengths for more vibrant renderings) in the above settings.

To digress a moment, the inventor has also observed some interesting visual effects using wintergreen or peppermint oil for an embodiment of organic spastic button construction; said oils potentially exhibiting the curious properties of changing ultraviolet light to visible light under conducive settings. The inventor manipulated such properties in a projection-screen environment, safely, as the experiment was cast only with a safe UV light source (an UVA black light was used). Use of cathode and electron rays also being serviceable to the present discourse.

A magnetically and electrically sensitive modulating membrane 74 that assumes a three-dimensional form or appearance (e.g. an inner cavity 75 with collapsible and expandable "layers" or regions surrounding said cavity 75 that is used for variably manipulating a topography of said form) is capable of serving as a "live" projection surface of changing shapes, structures, sizes and/or recognizable (assumed) ipseities. An air current modulation means 76 is also annotated.

As a case in point, and without suggestion of limitation, a spherical-like projection screen (not illustrated) is manipulated to form the resemblance or shape of a "knapsack" and a complimentary facade projection was used to display the knapsack's "contents" against its surface. The surface may also be composed of irregular ripples or patterns of interference for added visual effects. Directrix patterns, in the exemplary, are present in the described tunable projection screen under an induced manipulation.

A plurality of independent projections, coincidentally occurring at each side and front of the knapsack's (screen) surface and, contrastively, a separate projection event wherein light is beamed vertically through the bottom of a vertically-draped 3-D membrane—e.g. using an attached, inchoate strip of light to the bottom lining of said receiving membrane—such that the vertically-disposed light travels traversely through said membrane's surface to form a glowing effect on its structure, are both further serviceable to the spirit and scope of this disclosure. As are use of phosphorescent fibers and currents of air, including a current apparatus at a projection tip and currents both external and internal to the surface of an exemplary cylindrically-shaped projection screen 74 forming a manipulable cavity at its center.

The inventor, further still, observed interesting shadow effects (including the occurrence of partial shadow overlap that may be used in a stereoscopic sense) produced on active projection surfaces when attempts to directly manipulate such projected objects were made; including shadow effects against a light-based spectrum formed and/or projected by a prism originating at a distal point.

Moreover, a projection-screen embodiment may find one or more screens printed with invisible indicia that only become visible under safe, low-level laser-light projections generated by an exemplary ND:Yag crystal and may be further used to create a confluence of actionable object effects on said screen. As well as with the use of stroboscopes with varying light dispositions.

A green laser is selected due to its smaller spot diameter and thus, higher resolution capabilities (a 532 nm wavelength for green versus 1064 nm for red) for capably revealing even tiny details of said indicia. And for its high contrast value. Where colored laser combinations are used, restrictive coatings permitting the reflection/transmission of only a prescribed wavelength and dot-compression technology may be offered. An electron beam may also be configured to interact with said 532 nm laser for producing safe and stable visual effects, generally.

To elaborate on said indicia, albeit disparately, scrollable signage displaying such indicia, including composition with surfaces acting as dielectric elastomers revealing said indicia upon an excitation means, may be used in traditionally unfamiliar settings: such as in embodiments depicting scaled, impact-based advertisement. Use of rare earth (e.g. lanthanide, magnets, etc) and alkaline-earth elements may be applied to said elastomers if they result in either higher compression or afford greater design synergies; the preceding being used in a non-limiting sense.

Use of a base photoreceptor drum for the constitution of both positive and negative electrical charges in association with an active scroll and a transient, ephemeral or expiring indicia-based ink for intended interaction with said electrical charges, is further serviceable to the present discourse; as is a divergent embodiment comprising a laser light system designed such that one or more laser beams are attracted to a charged phosphor coating on said type of scroll in creating dynamic light displays with full color potential. Diffraction gratings may be used.

Public beaches, now expanding on the point using thermally-induced indicia from an invisible state, may post walkways that are coated with an agent that responds (visibly appears) to heat at a certain activation point. At a predisposed activation temperature, for instance, a literal temperature reading coated on a surface will become visible.

Particularly then, at an exemplary temperature of at least 80 degrees, a previously-applied coating at a beach boardwalk will appear (e.g. said coating will read: 80 degree heat! Time to chill!) and wherein a promotional banner of an ice cream cone will appear just a few steps further down the boardwalk informing the consumer that relief is just steps away at a neighboring ice cream parlor. Such examples, of course, acting to further buttress the breadth and scope of the present disclosure.

An indicia or projection-display system may additionally assume an alternate configuration. Sharing a like form to eyeglasses in comprising a frame that includes a first arm and second arm for positioning over the respective temple regions of a user and used for stabilizing the display unit, a nosepiece for resting on the bridge of a nose, said indicia or projection-display system then markedly differs from said eyeglasses by replacing each lens member with a projection surface for receiving projections dorsally in a fluent viewing environment.

An interaction of said projection content between both lenses may be used to create the illusion of sidewaysflowing movement versus a stereoscopic approach to content disposition; this without suggestion of limitation.

Parenthetically, using an element of art, i.e. form, that artists use to describe the 3-D qualities of an artwork may also be useful for transitionally shaping projection content for the described applications. Even to enhance said illusion of depth on a dynamic screen. Form, naturally, being simulated in a 2-D space through strategic use of line, shape and value.

In FIG. 7A, the inventor depicts an open-topography projection system 700 using a humidity extracting and diffusion apparatus 701 for creating and controlling a vapor wall 703. Said open-topography projection system 700 using water-vapor properties 701 present to promote a rather indiscernible projection surface 703 when viewed by a user; this unobtrusive surface 703 potentially comprising one or more refractive indexes and leveraging the acumen that air scatters light according to presented frequencies.

A negative ionic generator 702 (for ionizing the air of a proximal region), may also be used to form an indiscernible projection surface 703, at rest—that is, an indiscernible projection surface 703 will become "visible" upon a collision of its surface with a light projection source 704. The described air-ionizing device 702 will operate ozone free and be capable of pressurization of an output where serviceable. Ionic steam vapors, including those that emit environmentally friendly sodium and other doped vapor densities and/or those distinguished by polarization states are further serviceable to the embodiment. As are aerosolized vapors and using the properties of magnetism to manipulate and/or suspend magnetized particles for the formation of said indiscernible projection surface 703.

Plasmic air, a plasma of ionized air coalescing with a bond of water particles leading to mild saturation, light pipes and a hollow iridescent globe (bubble) formed from a film of soapsuds (et al material) that is manipulated by a current injection is also serviceable to the present discourse.

While negative ionic generators, comprising a network of interconnected conductors and an associated voltage source, are clearly not new to the art, the inventive discourse, of course, is to develop a unique apparatus that transitions this (and other serviceable) technology to help create useful projection surfaces 703 with latent qualities.

Ions 705, including cations 705, anions 705 or ionic current 705, may be further manipulated, by any means serviceable, to attract aerial water present in said environment and used to create, control and/or complement a proximal projection canvas 703 made from these marshaled constituents.

Moreover, as an example, the air-ionizing device may be designed to release indiscernible "clouds" of charged ions 705 that is supplemented with a trace mist or akin to help produce the desired air-surface region.

The system will, of course, be operated responsibly since it is well known in the art that exposure to negative ions, while many purporting of its health benefits, can, for example, result in a blood-thinning effect like that with aspirin and may thus not be suitable for all users.

While recited characteristics and conditions of the invention have been described in connection with certain embodiments, it is to be understood that the invention is not to be limited to the disclosed embodiments but, on the contrary, is intended to cover various modifications and equivalent arrangements included within the full spirit and scope of the appended claims; said claims being afforded the broadest interpretations and scope as permitted.

The invention claimed is:

1. A unique structural combination comprising a stacked circuit assembly and a battery unit assembly in a mobile touchscreen device, comprising:
    a multi-layer configuration comprising a first layer having one or more surfaces for mounting electronic components thereon and a second layer electrically coupled to the first layer and having one or more surfaces for mounting electronic components thereon; each of the layers comprising a circuit board substrate forming the stacked circuit assembly;
    wherein the stacked circuit assembly is a stacked circuit board assembly and offers a more compact structure, more integration in a fixed board area and a higher level of miniaturization in PCB manufacturing than a traditional circuit board the stacked circuit assembly replaces in the mobile device; an absorbable space is thereby designedly created in the mobile device for being absorbed by operational components including at least the battery unit; and
    wherein by absorbedly extending into the space, the battery unit comparably acquires at least one of a larger size, a higher charge storage capacity and a different shape than a traditional battery assembly the battery unit designedly replaces.

2. The mobile touchscreen device of claim 1, wherein the layers are spaced and, of the electronic components mounted on the stacked circuit assembly, at least one component mounted on one of the layers is electrically coupled with another component on at least one of the same layer and the opposing layer.

3. The mobile touchscreen device of claim 1, wherein the stacked circuit assembly interfaces with the battery unit assembly similar to puzzle pieces; the stacked circuit assembly comprises a L-shaped or a C-shaped configuration; and/or the battery unit assembly comprises a L-shaped or a C-shaped configuration.

4. The mobile touchscreen device of claim 1, wherein the different shape of the battery is at least one of a shape influenced by the shape of the absorbable space; a 6-sided shape once extendedly absorbed; a shape other than a four-sided shape; and a puzzle shape.

5. The mobile touchscreen device of claim 4, wherein the battery shape comprises a single piece or two or more interconnectable pieces connected together; and/or wherein the single piece or the interconnectable pieces are constructed to be flexible.

6. The mobile touchscreen device of claim 1, wherein one or more other operational components in the device share the absorbable space with the battery unit.

7. The mobile touchscreen device of claim 1, having one or more PCB cavities disposed in either one or both of the substrate layers; and/or forming a component cavity defined in an interior of at least one of the components such that one opposing component is positioned to at least partially extend into the component cavity by using corresponding shapes therefor.

8. The mobile touchscreen device of claim 1, wherein the battery adds a receiving channel for absorbedly accommodating at least a flexible circuit across the channel.

9. A unique structural combination comprising a stacked circuit assembly and a battery unit assembly in a mobile touchscreen device, comprising:
    a multi-layer configuration comprising a first layer having one or more surfaces for mounting electronic components thereon and a second layer electrically coupled to the first layer and having one or more surfaces for mounting electronic components thereon; each of the layers comprising a circuit board substrate forming the stacked circuit assembly;

wherein the stacked circuit assembly is a stacked circuit board assembly and offers a more compact structure, more integration in a fixed board area and a higher level of miniaturization in PCB manufacturing than a traditional circuit board the stacked circuit assembly replaces in the mobile device; an absorbable space is thereby designedly created in the mobile device for being absorbed by operational components including at least the battery unit;

wherein by absorbedly extending into the space, the battery unit comparably acquires at least one of a larger size, a higher charge storage capacity and at least one of a L-shape and a different shape than a four-sided shape of a traditional battery assembly the battery unit designedly replaces; and the forming of a component cavity defined in an interior of at least one of the components such that one opposing component is positioned to at least partially extend into the component cavity in order to further reduce the footprint of the stacked circuit board assembly.

10. A stacked circuit mainboard assembly and battery assembly disposed in the volume of a mobile device, comprising:

a first circuit board having a first mounting surface and a second mounting surface opposite the first mounting surface for mounting electronic components thereon; and a second circuit board electrically coupled to the first circuit board and having at least a first mounting surface for mounting electronic components thereon;

wherein the first circuit board is stacked over the second circuit board in configuring the stacked circuit board assembly;

wherein each of the first and second circuit boards achieve a higher interconnect density per unit area than a traditional mainboard architecture, thus reducing the size of the main board and making space, especially as stacked, for other components including at least the battery assembly;

wherein since the battery assembly is configured to absorb into, or to occupy, the made space at least partially, the battery unit comparably acquires at least one of a larger size, a larger capacity and a different shape than a traditional battery assembly the battery assembly is designed to replace in the mobile device;

wherein circuits on the first and second circuit boards comprise the respective electronic components; and wherein the higher interconnect density, possessing characteristic feature sizes close to that of an IC substrate level or at IC scale, is achieved in a smaller interconnect space using IC technologies.

11. The stacked circuit mainboard assembly of claim 10, wherein additive process steps are adopted from IC substrate fabrication to fabricate the circuits; and wherein the first and second circuit boards are substrate-like printed circuit boards (SLP) with package substrate like features.

12. The stacked circuit mainboard assembly of claim 11, wherein the additive process steps include a semi-additive process (SAP) and a modified semi-additive process (MSAP).

13. The stacked circuit mainboard assembly of claim 12, wherein at least one of each of the circuits comprise semiconductor-like line and space features and each of the circuits is formed by lithographic patterning.

14. The stacked circuit mainboard assembly of claim 10, wherein at least one of the following semiconductor fabrication techniques apply, as selected from a group consisting of plasma-enhanced chemical vapor deposition (PECVD), chemical vapor deposition (CVD), atmospheric pressure CVD, sputter deposition, sputter etching, vapor phase etching, wet chemical etching, additive etch process, subtractive etch process, maskless lithography, masking lithography, lithography, photolithography, e-beam lithography, nanolithography, micro/nano manufacturing processes, lift-off deposition, pulsed laser deposition, magnetron sputtering, etching, laser ablation, evaporation, thin film deposition and the formation of thin solid films of a variety of materials by deposition from the gas, vapor, liquid, or solid phase in semiconductor fabs.

15. The stacked circuit mainboard assembly of claim 10, further comprising at least one of a thinner board or thinner-board materials in a traditional progression; a laser or laser ablation technique to create miniaturized holes in the printed circuit board materials; a semi-additive metallization process; a modified semi-additive metallization process; and laser technologies, processes and applications in a variety of PCB manufacturing processes therefor.

16. The stacked circuit mainboard assembly of claim 10, wherein at least one of: the stacked circuit board assembly is precision-made and comprises a miniaturization of the electronic components and the PCBs; at least one of the first and second circuit board contain embedded components placed within a cavity, or a laser cavity, either during formation, or after the formation, of the respective first and second circuit board; a component cavity is used such that one component is positioned in another component; the stacked configuration further comprises at least a third printed circuit board; and the stacked circuit board assembly comprises advanced substrate technologies.

17. The mobile device of claim 10, wherein: one or more EFTEM imaging techniques are applied in relation to manufacturing the substrate-like PCBs (SLP); an ink that enables additive processing is used in relation to the substrate-like PCB(s) (SLP); a patterned deposition of nanoparticle solutions or nanoinks is made onto one or more substrates, which can include substrates for flexible electronics; materials and processes for printed electronics are used; and one or more technological applications of a type of smart fluid or Electrorheological (ER) fluid are used.

18. The mobile device of claim 10, wherein the circuit board assembly uses a flexible circuit for communication of electrical signals between the electronic components located on the first circuit board and/or the second circuit board.

19. The mobile device of claim 18, wherein the flexible circuit may electrically and mechanically couple with the first circuit board, and form a loop to electrically and mechanically couple with the second circuit board.

20. The mobile device of claim 10, wherein the circuit board assembly may include several interconnects designed to carry signals between the first and second circuit boards, such that the first and second circuit boards, as well as their respective operational components, are in communication with one another.

21. The mobile device of claim 10, wherein at least one of the following applies: the battery assembly's different shapes are formed to accommodate other internal components and/or to utilize the made internal space; the battery assembly is formed with a channel for receiving a flexible circuit across said channel; and one or more other internal components are designedly repositioned in the internal volume of the mobile device for creating creating yet more absorbable and usable space for at least the battery assembly to occupy at least partially.

22. The mobile device of claim 10, comprising a touch-sensitive display and at least one of one or more sub boards, one or more processors, one or more integrated circuits, a memory configuration including a semiconductor memory, a communications module, a SIM card providing network access to a mobile communications network, one or more motion sensors, one or more camera sensors, one or more infrared sensors, one or more depth sensors, one or more pressure sensors, a fingerprint sensor, an accelerometer, a gyroscope and a magnetometer.

23. The mobile device of claim 10, wherein at least one of: the stacked circuit board assembly comprises a L-shaped, I-shaped or a C-shaped configuration; the battery assembly comprises a L-shaped, I-shaped or a C-shaped configuration; and the battery assembly is configured such that the battery assembly accommodates the stacked circuit board assembly in the internal volume.

24. The mobile device of claim 23, wherein the stacked circuit board assembly interfaces with the battery assembly similar to puzzle pieces.

25. The stacked circuit mainboard assembly of claim 10, wherein a space exists between the first circuit board and the second circuit board; and wherein the number of PCB layers is increased, thereby reducing the board area of the mainboard assembly compared to the traditional mainboard architecture.

26. The stacked circuit mainboard assembly of claim 10, wherein the two or more stacked printed circuit boards have a size and shape that is the same, or is at least substantially similar to, each other; or wherein the first circuit board and the second circuit board have a size and shape that is different or is at least substantially dissimilar in size and shape to each other.

27. The stacked circuit mainboard assembly of claim 10, wherein by at least adding functionality and increasing performance, either one or both of the first and second circuit boards (SLPs) can offer an integration solution in addition to interconnection.

* * * * *